US008412863B2

(12) United States Patent
Tanaka et al.

(10) Patent No.: US 8,412,863 B2
(45) Date of Patent: Apr. 2, 2013

(54) STORAGE APPARATUS AND VIRTUAL PORT MIGRATION METHOD FOR STORAGE APPARATUS

(75) Inventors: Katsuya Tanaka, Kokubunji (JP); Masanori Takada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 12/990,016

(22) PCT Filed: Oct. 19, 2010

(86) PCT No.: PCT/JP2010/006188
§ 371 (c)(1),
(2), (4) Date: Oct. 28, 2010

(87) PCT Pub. No.: WO2012/053031
PCT Pub. Date: Apr. 26, 2012

(65) Prior Publication Data
US 2012/0096192 A1  Apr. 19, 2012

(51) Int. Cl.
*G06F 3/00* (2006.01)
(52) U.S. Cl. .......................... 710/20; 710/36
(58) Field of Classification Search .................. None
See application file for complete search history.

(56) References Cited

U.S. PATENT DOCUMENTS

2008/0148295 A1  6/2008  Freimuth et al.
2009/0144731 A1*  6/2009  Brown et al. ............... 718/1
2009/0248973 A1  10/2009  Deshpande et al.
2010/0088456 A1*  4/2010  Chu et al. ................. 710/316
2010/0115174 A1  5/2010  Akyol et al.
2011/0202701 A1*  8/2011  Maitra ...................... 710/308

FOREIGN PATENT DOCUMENTS

JP  2008-152786    7/2008
JP  2008-152786 A  7/2008

OTHER PUBLICATIONS

PCI-SIG, "Multi-Root I/O Virtualization and Sharing Specification, Revision 1.0, Section 3.2.4," pp. 104-107.
Regula, "Using Non-Transparent Bridging in PCI Express Systems," PLX Technology, Inc., pp. 1-31 (Jun. 1, 2004).
PCI-SIG, "Multi-Root I/O Virtualization and Sharing Specification, Revision 1.0, Section 3.2.4," pp. 104-107, (2008).
Regula, Jack, "Using Non-transparent Bridging in PCI Express Systems," PLX Technology, Inc., pp. 1-31, (Jun. 1, 2004).

* cited by examiner

*Primary Examiner* — Idriss N Alrobaye
*Assistant Examiner* — David Martinez
(74) *Attorney, Agent, or Firm* — Volpe and Koenig, P.C.

(57) ABSTRACT

The object of the present invention is to provide a technique in which, in a storage apparatus using a PCI Express switch in an internal network, an EP can be shared among processors even if the EP is incompatible with the MR-IOV. A storage apparatus according to the present invention is provided with a first interface device which controls data input/output to and from a higher-level apparatus, and the first interface device is further provided with multiple virtual function units which provide virtual ports. The first interface device enables any of the virtual function units and does not enable any of the other virtual function units (see FIG. 14).

10 Claims, 30 Drawing Sheets

FIG. 15

| NTB# | CAM Entry# | CPU# | RP# | VF# |
|---|---|---|---|---|
| 0 | 1 | 0 | 0 | 1 |
| 0 | 2 | 0 | 0 | 2 |
| 0 | 3 | 0 | 0 | 3 |
| 0 | 4 | 0 | 0 | 4 |
| 0 | 5 | 0 | 0 | 5 |
| 0 | 6 | 0 | 0 | 6 |

FIG. 16

| VF# | VF RID | Status | WWPN | Sub. VF# |
|---|---|---|---|---|
| 1 | VF1_RID | Add | WWPN1 | 14 |
| 2 | VF2_RID | Remove | WWPN2 | |
| 3 | VF3_RID | Remove | WWPN3 | |
| 4 | VF4_RID | Remove | WWPN4 | |
| 5 | VF5_RID | Remove | WWPN5 | |
| 6 | VF6_RID | Remove | WWPN6 | |

STORAGE APPARATUS AND VIRTUAL PORT MIGRATION METHOD FOR STORAGE APPARATUS

TECHNICAL FIELD

The present invention relates to a storage apparatus.

BACKGROUND ART

A storage apparatus generally has a storage controller and a randomly accessible nonvolatile storage medium. This storage medium is, for example, a disk array including multiple hard disk drives (HDDs) or nonvolatile semiconductor memory drives (SSD: solid state drives).

The storage controller includes a front-end interface (FEIF) for connecting a higher-level apparatus (such as a host system), a back-end interface (BEIF) for connecting the disk array, and a cache memory (CM) for temporarily storing data which the higher-level apparatus reads from and writes to the disk array, and an interface (CMIF) for the CM. The storage controller further has a processor for controlling data transfer between the host system and the CMIF and between the disk array and the CMIF.

As a communication network standard specification for connecting a processor with an FEIF, a BEIF and the like, "PCI Express" is known. As extended specifications of the PCI Express, "Single-Root I/O Virtualization and Sharing Specification" (hereinafter "SR-IOV"), which is a standard specification for an I/O device compatible with the PCI Express to support virtualization, and "Multi-Root I/O Virtualization and Sharing Specification" (hereinafter "MR-IOV"), which is a standard specification for multiple processors to share an I/O device, are known.

By an endpoint (hereinafter "EP"), which is an I/O device, having at least one physical function (PF), an apparatus in conformity with the SR-IOV specification can provide multiple virtual functions (VFs) for each physical function. Both of the physical function and the virtual function can provide an interface function as an I/O device. It is also possible that the physical function is devoted to set and manage virtual functions and that only the virtual function provides an interface function. In this specification, a port which is an interface provided by a virtual function will be referred to as a virtual port.

An apparatus in conformity with the MR-IOV specification includes, for example, multiple root complexes (hereinafter "RCs") to which a processor is connected respectively, multiple root ports (hereinafter "RPs") which the RCs include, multiple EPs which are to be starting points for input/output of data, and multiple switches for connecting the RPs and EPs. Each EP is configured so that it can provide its function (a data transfer function of transferring inputted data to another device) for each of processors accessing the EP via the RPs (so that the processor can control data transfer on the EP). The multiple processors can share each EP due to such a configuration. Each processor can independently access the EP via the RPs (each can independently control data transfer on the EP). Thereby, the multiple processors can independently execute data transfer without increase in the number of the EPs, and the performance of the data transfer process is enhanced.

In the MR-IOV, a tree-shaped topology constituted by one RP, and one or more EPs and switches logically connected to the RP is referred to as a "virtual hierarchy" (hereinafter "VH"). In a communication network in conformity with the MR-IOV (hereinafter an "MR-IOV network"), there exist the same number of VHs as the number of multiple RPs existing in the MR-IOV network.

One VH indicates an address space for data transfer controlled by a processor for each RP. For example, suppose that there exist a first VH constituted by an RP1, an EP1 and an EP2, and a second VH constituted by an RP2, the EP1 and the EP2 in an MR-IOV network. It is assumed that the RP1 is provided for an RC1 to which a processor 1 is connected, and the RP2 is provided for an RC2 to which a processor 2 is connected. In this case, the processor 1 and the processor 2 can independently control data transfer from the EP1 to the EP2 (or vice versa) via the RP1 on the first VH and via the RP2 on the second VH, respectively.

One EP can implement both of the MR-IOV and the SR-IOV. In this case, the function of the SR-IOV is implemented for each of VHs supported by the EP. That is, an EP compatible with both of the MR-IOV and the SR-IOV includes a physical function and multiple virtual functions related thereto for each VH. Furthermore, the EP compatible with both of the MR-IOV and the SR-IOV can support VF migration for migrating a virtual function between VHs. Since the VF migration can be applied to load balancing between VHs, enhancement of the performance of a storage apparatus can be expected by implementing an EP supporting the VF migration in an internal network of a storage controller.

PTL 1 described below discloses a technique for migrating a virtual function between physical functions in an EP compatible with the SR-IOV. NPL 1 described blow discloses a technique about the VF migration in an EP compatible with the MR-IOV.

Citation List
Patent Literature
PTL 1: JP Patent Publication (Kokai) No. 2008-152786 A
Non Patent Literature
NPL 1: "Multi-Root I/O Virtualization and Sharing Specification, Revision 1.0, Section 3.2.4"; 2008; Author: PCI-SIG; pp. 104 to 107

SUMMARY OF INVENTION

Technical Problem

As for an EP compatible with the MR-IOV (in the above example, the EP1 and the EP2), if there are multiple VHs including the EP as a component (VHs supported by the EP), the EP is shared among the multiple VHs (in the above example, between the first VH and the second VH). That is, in the MR-IOV, each EP is required to provide its data transfer function for each of one or more VHs the EP supports. This data transfer function provided by the EP refers to the physical function described above.

In the case of increasing the number of processors for enhancement of performance in an MR-IOV network, an EP has to support the number of VHs corresponding to the number of processor-connected RPs. That is, the EP is required to be provided with the number of physical functions corresponding to the number of processor-connected RPs to realize the data transfer function for each VH. In general, an EP is realized by a semiconductor integrated circuit. Since the area of the semiconductor integrated circuit increases in proportion to the number of physical functions, the cost of an MR-IOV-compatible EP provided with a lot of physical functions is high. In comparison, the cost of an SR-IOV-compatible EP is lower than the MR-IOV-compatible EP because it is sufficient if the SR-IOV-compatible EP is provided with at least one physical function.

In order to enhance the performance and reliability of a storage apparatus, it is desirable to share an EP among processors and enable migration of its virtual function. In order to realize a similar function using an EP which is not compatible with the MR-IOV, it is necessary to migrate a virtual function between virtual hierarchies. However, the conventional technique described in PTL 1 does not disclose a method for an MR-IOV-incompatible apparatus to migrate a virtual function between virtual hierarchies. The conventional technique described in NPL 1 requires an MR-IOV-compatible EP.

The present invention has been made to solve the above problems, and its object is to provide a technique for, in a storage apparatus using a PCI Express switch in an internal network, enabling an EP to be shared among processors and enabling its virtual function to be migrated between VHs even if the EP is incompatible with the MR-IOV.

Solution to Problem

A storage apparatus according to the present invention is provided with a first interface device which controls data input/output to and from a host system, and the first interface is further provided with multiple virtual function units which provide virtual ports. The first interface device enables any of the virtual function units and does not enable any of the other virtual function units.

Advantageous Effects of Invention

A storage apparatus according to the present invention can secure virtual function units which are not enabled and enable these virtual function units when needed. Thereby, even in the case of providing a virtual port using an EP which is not compatible with the MR-IOV, in a first interface device, it is possible to take over a function between virtual ports and share the virtual ports among processors. Furthermore, since the above function is realized with the use of an EP which is not compatible with the MR-IOV, the cost of the storage apparatus can be reduced.

BRIEF DESCRIPTION OF DRAWINGS

FIG. 15 is a diagram showing the configuration of an NTB management table 1500 managed by a sub-processor 201 and a data example.

FIG. 16 is a diagram showing the configuration of a virtual port management table 1600 managed by a sub-processor 201 and a data example.

DESCRIPTION OF EMBODIMENTS

Figure 1:
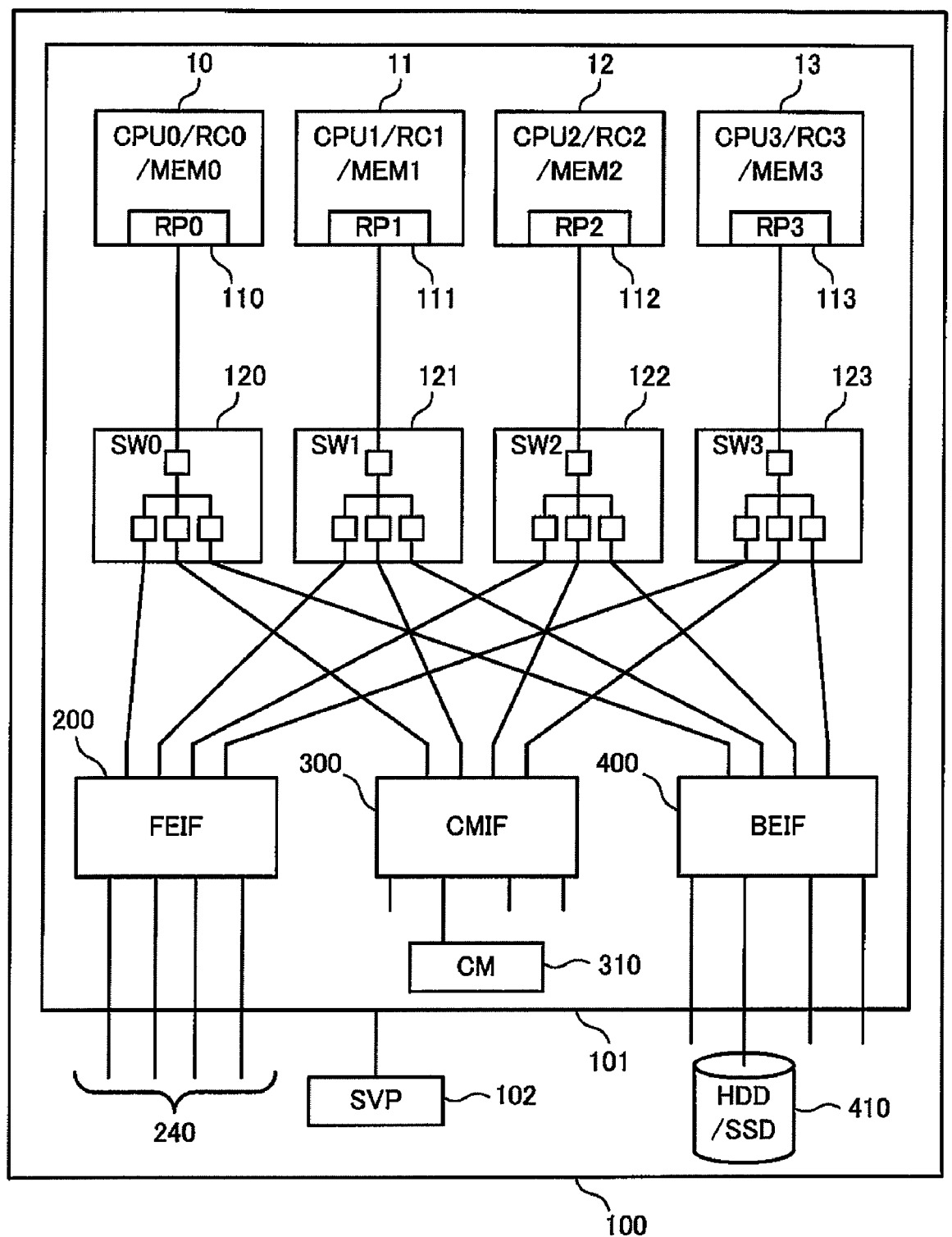
FIG. 1 is a functional block diagram of a storage apparatus 100 according to a first embodiment.

Embodiments of the present invention will be described below with reference to drawings. Components given the same reference numerals are assumed to be substantially the same through all the embodiments.

First Embodiment

A storage apparatus 100 according to a first embodiment of the present invention will be described with the use of FIGS. 1 to 16. In the first embodiment, an SR-IOV device capable of providing multiple virtual functions is adopted as a front-end interface, and a function of migrating a virtual port between virtual functions is provided. A port which is an interface provided by a virtual function will be referred to as a virtual port.

FIG. 1 is a functional block diagram of the storage apparatus 100 according to the first embodiment of the present invention. The storage apparatus 100 includes a storage controller (hereinafter referred to simply as a controller) 101 and a disk array 410. The disk array 410 is provided with a group of storage devices, for example, such as multiple HDDs and SSDs. A higher-level apparatus on an external network (for example, a host system and the like) is connected to the controller 101 via a channel 240. A management terminal (SVP: service processor) 102 is also connected to the controller 101.

Internal networks of the controller 101 are constituted by mutually connecting four root ports 110 to 113 (RP0 to RP3) provided for each of four main processors 10 to 13 (CPU0 to CPU3), four PCI Express (hereinafter abbreviated as PCIe) switches 120 to 123 (SW0 to SW3), and three storage interfaces (FEIF 200, CMIF 300 and BEIF 400).

The storage interfaces are the front-end interface (FEIF) 200, the cache memory interface (CMIF) 300 and the back-end interface (BEIF) 400. The root ports 110 to 113 (RP0 to RP3) of the main processors connect the FEIF 200, the CMIF 300 and the BEIF 400 via the PCIe switches 120 to 123 (SW0 to SW3), respectively, as independent PCIe trees.

The FEIF 200 corresponds to the "first interface device". The BEIF 400 corresponds to the "second interface device".

Memories (MEM0 to MEM3) and root complexes (RC0 to RC3) are connected to the main processors 10 to 13 (CPU0 to CPU3), respectively.

The number of components constituting the controller 101 and the connection route configuration are not limited to those illustrated in FIG. 1.

The main processors 10 to 13 (CPU0 to CPU3) execute various processes by executing various computer programs stored in the memories (MEM0 to MEM3). For example, each of the main processors 10 to 13 (CPU0 to CPU3) controls data transfers between a host system and a CM (cache memory) 310 and between the CM 310 and the disk array 410. In the memories (MEM0 to MEM3), various computer programs to be executed by the main processors 10 to 13 (CPU0 to CPU3) and various table information and the like to be referred to by the main processors 10 to 13 (CPU0 to CPU3) are stored.

By operating the management terminal 102, an administrator can perform works such as setting/changing of values held by each table to be described later, and maintenance and management of the storage apparatus 100. When operating the management terminal 102 to set table information, the administrator inputs information to be set for the table information (setting information) to the management terminal 102. The management terminal 102 which has accepted the input transmits the inputted setting information to each of the main processors 10 to 13 (CPU0 to CPU3) via a network for management (not shown) in the controller 101. The main processors 10 to 13 (CPU0 to CPU3) which have received the setting information set or change target table information on the basis of the received setting information. The management terminal 102 is provided with an input device, such as a keyboard, and a display device, such as a display, to be used by the administrator for works for managing the storage apparatus.

Figure 2:
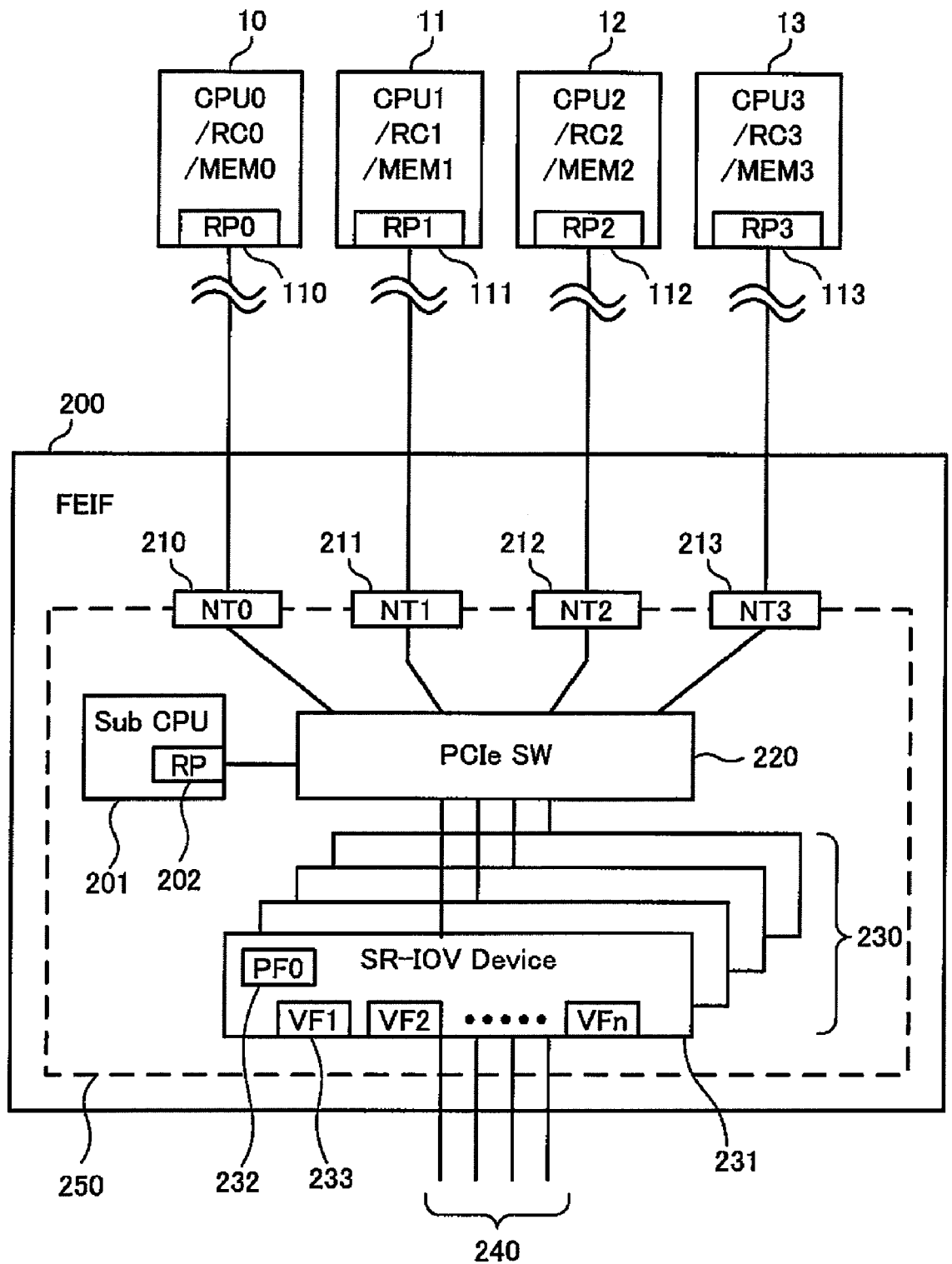
FIG. 2 is a diagram showing the internal configuration of a front-end interface (FEIF) 200.

FIG. 2 is a diagram showing the internal configuration of the front-end interface (FEIF) 200. The FEIF 200 is connected to a host system via the channel 240. The host system is, for example, a computer which issues an I/O request (a write request or a read request) to the storage apparatus 100. An SR-IOV device 230 converts a data transfer protocol used on the channel 240 and a data transfer protocol used on the internal networks (such as PCIe) in the controller 101 to each other.

The FEIF 200 includes at least one SR-IOV device 230. Since the configurations of the SR-IOV devices 230 are similar, a configuration example of an SR-IOV device 231 will be described here as a representative. The SR-IOV device 230 corresponds to the "virtual port device".

The SR-IOV device 231 includes a physical function unit 232 (physical function: PF0) and virtual function units 233 (virtual function: VF1 to VFn). Both of the physical function unit 232 and the virtual function units 233 can provide an interface function as an I/O device. In the description below, it is assumed that the physical function unit 232 is devoted to parameter setting and management of the virtual function units 233, and only the virtual function units 233 provide an interface function.

A port which is an interface provided by the virtual function units 233 will be referred to as a virtual port. A port which is an interface physically connected to an external network via a cable or the like in an SR-IOV device will be referred to as a physical port. For example, if one SR-IOV device includes multiple physical function units, the SR-IOV device includes the number of physical ports corresponding to the number of the physical function units. If an SR-IOV device includes only one physical function unit, multiple virtual function units (virtual ports) share the one physical port.

A PCIe switch 220 connects four non-transparent bridges (NTBs) 210 to 213 (NT0 to NT3), the SR-IOV device 230 (231) and a root port 202 which a sub-processor 201 includes. The PCIe switch 220 connects to the root ports 110 to 113 of the main processors 10 to 13 (CPU0 to CPU3) via the NTBs 210 to 213 (NT0 to NT3), respectively.

The sub-processor 201 executes various processes by executing various computer programs stored in its embedded memory (not shown). The sub-processor 201, for example, registers the physical function unit 232 and the virtual function units 233 with a device tree used for managing PCIe devices, loads the device drivers of the physical function unit 232 and the virtual function units 233, creates instances thereof and enables these function units. The embedded memory of the sub-processor 201 may be externally attached.

A PCIe tree 250 in which the root port 202 of the sub-processor 201, the PCIe switch 220, the SR-IOV device 230 (231) and the NTBs 210 to 213 (NT0 to NT3) are connected is configured as a PCIe tree different from PCIe trees related to the root ports 110 to 113 (RP0 to RP3) of the main processors 10 to 13 (CPU0 to CPU3).

Figure 3:
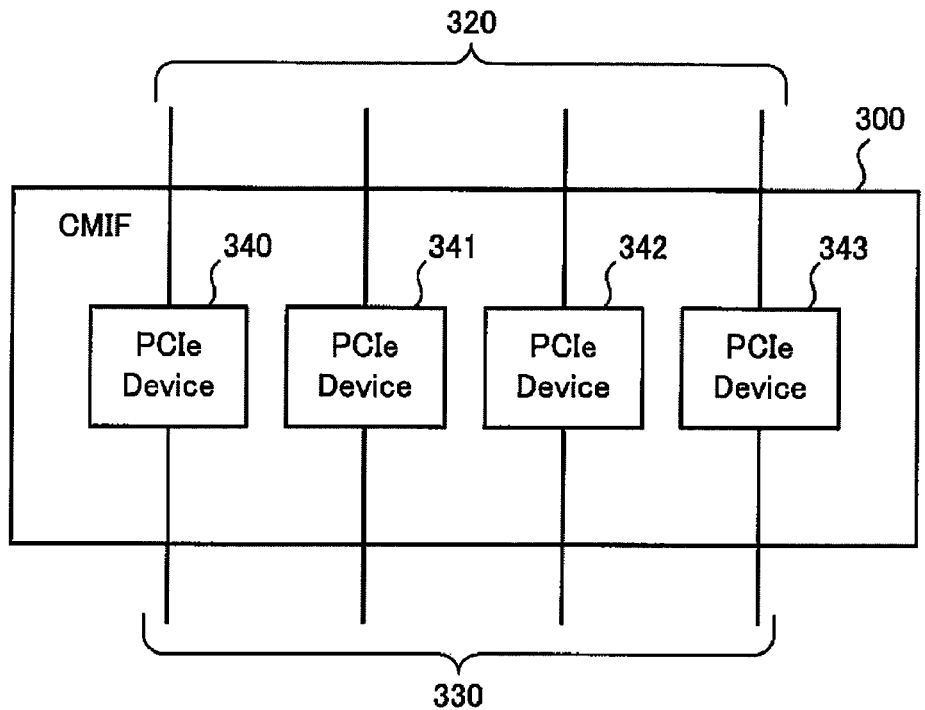
FIG. 3 is a diagram showing the internal configuration of a CMIF 300.

FIG. 3 is a diagram showing the internal configuration of the CMIF 300. The CMIF 300 is connected to the PCIe switches 120 to 123 (SW0 to SW3) via four PCIe links 320. The CMIF 300 is also connected to the CM 310 via a channel 330. The CM 310 temporarily stores data received from the FEIF 200, the BEIF 400 and the like. In the CM 310, there are stored control information and the like to be referred within the controller 101. The CMIF 300 includes four PCIe devices 340 to 343 which can be independently accessed from the main processors 10 to 13 (CPU0 to CPU3), respectively.

Figure 4:
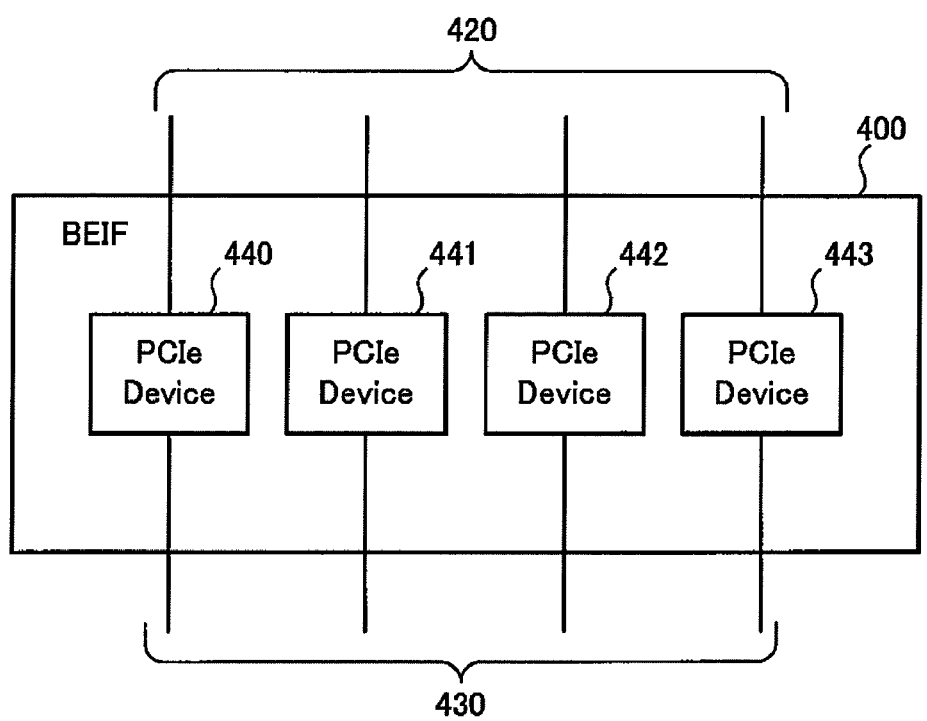
FIG. 4 is a diagram showing the internal configuration of a BEIF 400.

FIG. 4 is a diagram showing the internal configuration of the BEIF 400. The BEIF 400 is connected to the PCIe switches 120 to 123 (SW0 to SW3) via four PCIe links 420. The BEIF 400 is also connected to the disk array 410 via a channel 430. The BEIF 400 converts a data transfer protocol used on the channel 430 and a data transfer protocol used on the internal networks in the controller 101 to each other. The BEIF 400 includes four PCIe devices 440 to 443 which can be independently accessed by the main processors 10 to 13 (CPU0 to CPU3), respectively.

Figure 5:
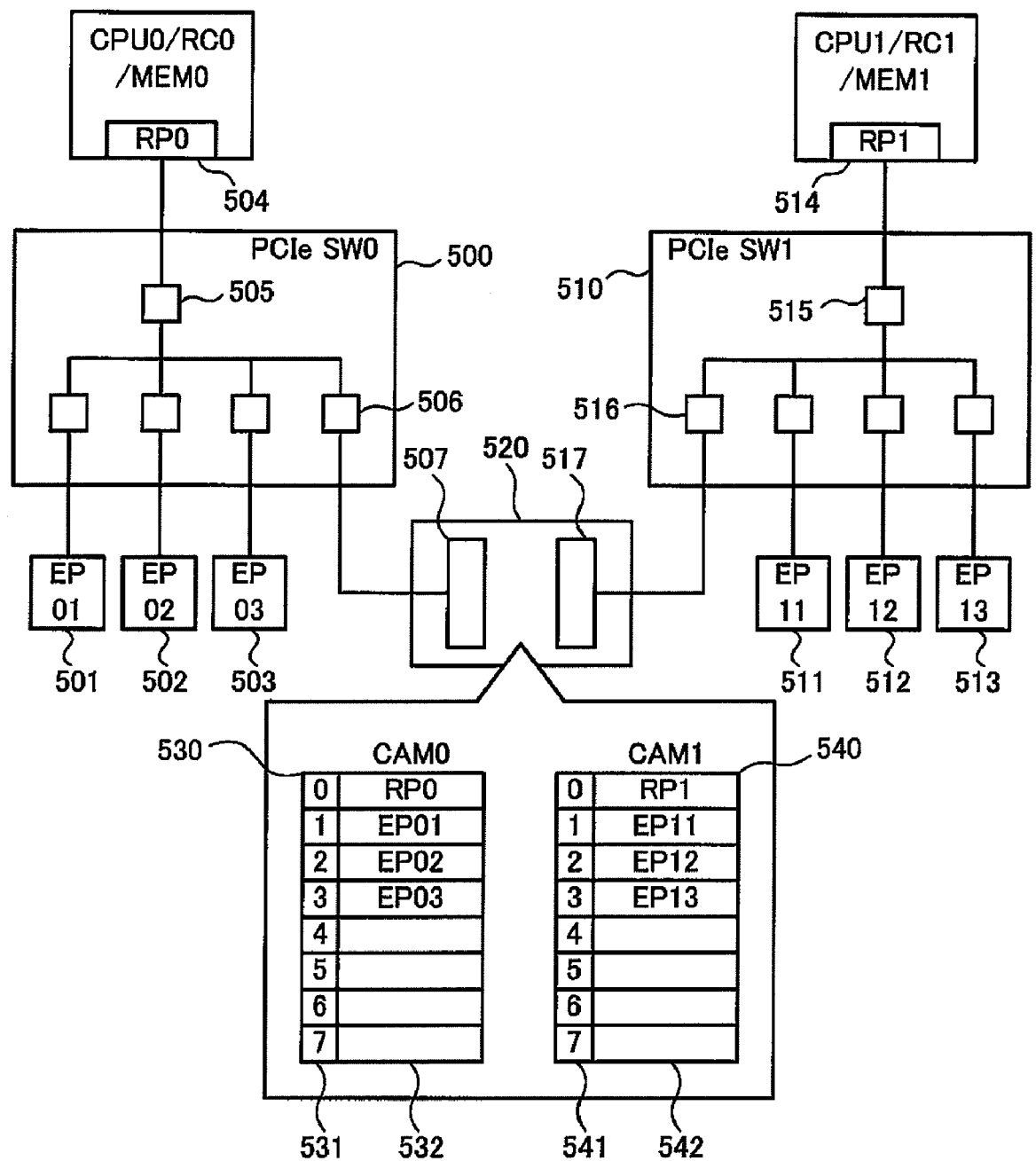
FIG. 5 is a diagram illustrating a general operation of a non-transparent bridge (NTB).

FIG. 5 is a diagram illustrating a general operation of a non-transparent bridge (NTB). Here, a general network configuration in which data is transferred between PCIe trees having different root ports via an NTB 520 will be illustrated for description.

A root port 504 which the CPU0 includes is connected to an upstream bridge 505 of a PCIe switch 500 (SW0). Three endpoints 501 to 503 (EP01 to EP03) are connected to a downstream bridge 506 of the PCIe switch 500. A virtual endpoint 507 in the NTB 520 is also connected to the downstream bridge 506 of the PCIe switch 500. According to the above configuration, the PCIe switch 500 connects the root port 504, the three endpoints 501 to 503 (EP01 to EP03) and the NTB 520.

A root port 514 which a CPU1 includes is connected to an upstream bridge 515 of a PCIe switch 510 (SW1). Three endpoints 511 to 513 (EP11 to EP13) are connected to a downstream bridge 516 of the PCIe switch 510. A virtual endpoint 517 in the NTB 520 is also connected to the downstream bridge 516 of the PCIe switch 510. According to the above configuration, the PCIe switch 510 connects the root port 514, the three endpoints 511 to 513 (EP11 to EP13) and the NTB 520.

The NTB 520 translates a transmission-destination address, and a requester ID (a request-source ID) or a completer ID (a request-destination ID) included in the headers of packets transmitted and received between PCIe trees (passing through the NTB 520), mutually between the PCIe trees having different root ports. The requester ID and the completer ID are information (device identifier) identifying the PCI function of a PCIe device within a PCIe tree and are called routing IDs (hereinafter RIDs). The RID is constituted by a bus number section (8 to 15 bits), a device number section (3 to 7 bits) and a function number section (0 to 2 bits). According to the PCIe specification, though it is not possible to perform data transfer between PCIe trees having different root ports, it becomes possible to perform data transfer between PCIe trees having different root ports by the NTB 520 translating the header of a packet appropriately.

In a different PCIe tree, not only the RIDs but also the transmission/receiving destination address systems may differ. The transmission-destination address of a packet passing the NTB 520 can be translated to an appropriate address value of the transmission destination by a method such as adding a predetermined offset value for the NTB 520 to the transmission-destination address included in the packet header. Alternatively, the NTB 520 may include an address mapping table showing correspondence between an address in a transmission-source PCIe tree and an address in a transmission-destination PCIe tree and perform address translation in accordance with the table.

An RID mapping table 530 (CAM0) is a table for translating the requester ID of a request packet transmitted by the root port 504 or the endpoints 501 to 503. The RID mapping table 530 is configured, for example, by an associative memory (content addressable memory). At the number 0 of tag number 531 and at the numbers 1 to 3 of the tag number 531, the RID of the root port 504 and the RIDs of the endpoints 501 to 503 are stored, respectively.

An RID having the same bus number section as the virtual endpoint 517, a different device number section, and "0" as the function number section is assumed to be "Y". For example, if a requester ID included in a packet header is that of the endpoint 501 (EP01), the NTB 520 translates the requester ID to "Y+1" in accordance with description in the RID mapping table 530. Similarly for a completion packet which is a response to a request packet transmitted by the root port 504 or the endpoints 501 to 503, the NTB 520 translates the requester ID in accordance with the RID mapping table 530 (CAM0). For example, if the requester ID included in the header of a completion packet is "Y+1", the requester ID is translated to the RID of the endpoint 501 (EP01).

At the time of translating a completer ID included in the header of a completion packet, for example, the values of the 3rd to 15th bits of the completer ID constituted by 16 bits (0th to 15th bits) are replaced with the values of the 3rd to 15th bits of the RID of the virtual endpoint 507.

An RID mapping table 540 (CAM1) is a table for translating the requester ID of a request packet issued by the root port 514 or the endpoints 511 to 513. At the number 0 of tag number 541 and at the numbers 1 to 3 of the tag number 541, the RID of the root port 514 and the RIDs of the endpoints 511 to 513 are stored, respectively.

An RID having the same bus number section as the virtual endpoint 507, a different device number section, and "0" as the function number section is assumed to be "X". For example, if a requester ID included in a packet header is that of the endpoint 512 (EP12), the NTB 520 translates the requester ID to "X+2" in accordance with description in the RID mapping table 540. Similarly for a completion packet which is a response to a request packet transmitted by the root port 514 or the endpoints 511 to 513, the NTB 520 translates the requester ID in accordance with the RID mapping table 540 (CAM1). For example, if the requester ID included in the header of a completion packet is "X+2", the requester ID is translated to the RID of the endpoint 512 (EP12).

At the time of translating a completer ID included in the header of a completion packet, for example, the values of the 3rd to 15th bits of the completer ID constituted by 16 bits (0th to 15th bits) are replaced with the values of the 3rd to 15th bits of the RID of the virtual endpoint 517.

In order to prevent deterioration of data transfer performance due to RID translation overhead, the number of RIDs which can be stored in the RID mapping table of an NTB is limited, and the number is, for example, eight to sixteen. In the description below, it is assumed that the number of RIDs which can be stored in the RID mapping table of an NTB is eight. However, the number is not limited thereto. If a requester ID included in a packet header is not stored in the RID mapping table of an NTB, the NTB does not allow the packet to pass.

When changing the transmission-destination address or RID (requester ID or completer ID) of a packet, an NTB also updates the data protection code (for example, ECRC: end-to-end cyclic redundancy code) of the packet. An offset value for the NTB to perform address translation, the contents of the RID mapping table and the like are set when the storage apparatus 100 is initialized or activated.

Figure 6:
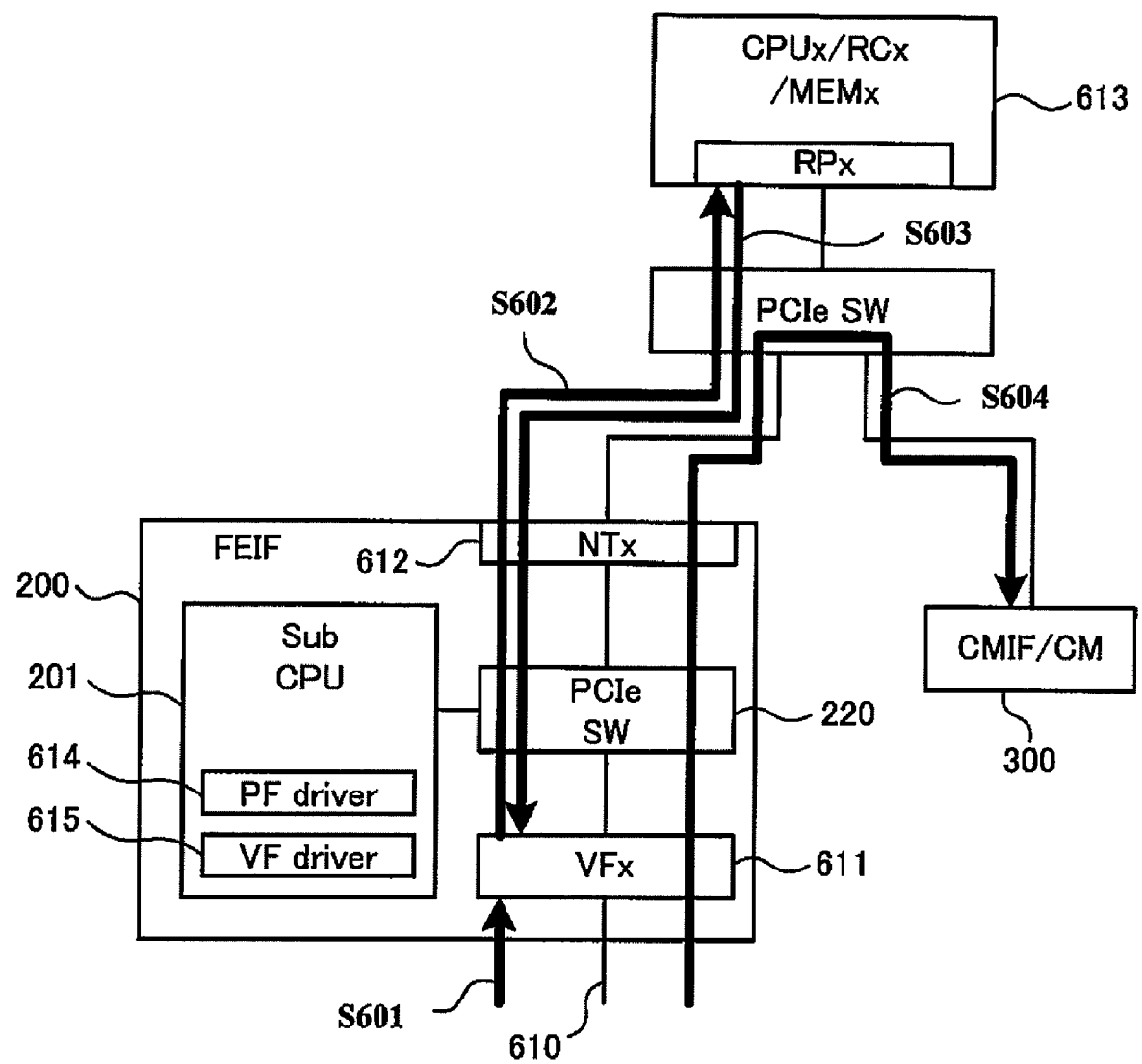
FIG. 6 is a diagram showing a write operation of the storage apparatus 100 according to the first embodiment.

FIG. 6 is a diagram showing a write operation of the storage apparatus 100 according to the first embodiment. Here, description will be made on an operation performed in the case where a virtual function unit 611 (VFx) of the FEIF 200 receives write data from a host system and stores it into the cache memory (CM) 310.

When the storage apparatus 100 is activated, the sub-processor 201 loads a PF device driver 614 for controlling a physical function unit and a VF device driver 615 for controlling virtual function units. Using the PF device driver 614, the sub-processor 201 enables a virtual function unit and performs setting and management of resources used by the virtual function unit. Furthermore, the sub-processor 201 performs separate setting and management for each of the multiple virtual function units using the VF device driver 615. When the storage apparatus 100 is activated, a non-transparent bridge 612 (NTx) is set an offset value for address translation and the contents of the RID mapping table.

(FIG. 6: Step S601)

The virtual function unit 611 (VFx) of the FEIF 200 provides a virtual port 610 for a host system. The virtual function unit 611 (VFx) waits for a write command packet to be transmitted by the host system via the virtual port 610.

(FIG. 6: Step S602)

The virtual function unit 611 (VFx) receives a write command and transfers the received write command packet to a main processor 613 (CPUx) via the non-transparent bridge 612 (NTx).

(FIG. 6: Step S603)

The main processor 613 (CPUx) receives the transferred write command, and transmits a transfer-destination address of write data to the virtual function unit 611 (VFx) via the non-transparent bridge 612 (NTx) on the basis of write-destination information included in the command.

(FIG. 6: Step S604)

The virtual function unit 611 (VFx) transfers the write data to the CMIF 300 via the non-transparent bridge 612 (NTx) on the basis of the transfer-destination address received from the main processor 613.

Figure 7:
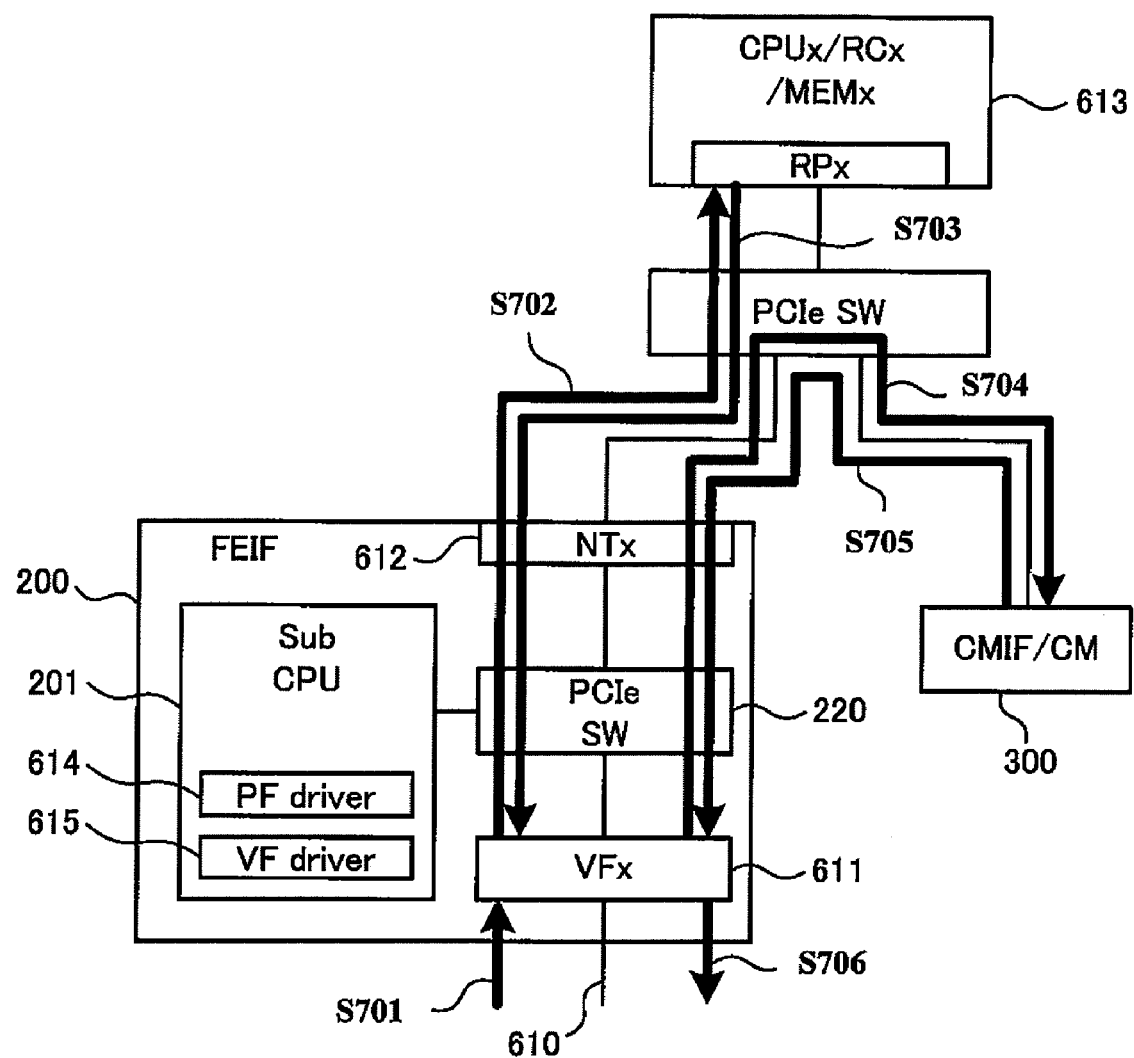
FIG. 7 is a diagram showing a read operation of the storage apparatus 100 according to the first embodiment.

FIG. 7 is a diagram showing a read operation of the storage apparatus 100 according to the first embodiment. Here, description will be made on an operation performed in the case where a host system issues a read request to the storage apparatus 100, and read-target data stored in the cache memory (CM) 310 is transmitted from the virtual function unit 611 (VFx) to the host system.

(FIG. 7: Step S701)

The virtual function unit 611 (VFx) of the FEIF 200 provides a virtual port 610 for a host system. The virtual function unit 611 (VFx) waits for a read command packet to be transmitted by the host system via the virtual port 610.

(FIG. 7: Step S702)

The virtual function unit 611 (VFx) receives a read command and transfers the received read command packet to the main processor 613 (CPUx) via the non-transparent bridge 612 (NTx).

(FIG. 7: Step S703)

The main processor 613 (CPUx) receives the transferred read command, and transmits the transfer-destination address of the read command to the virtual function unit 611 (VFx) via the non-transparent bridge 612 (NTx) on the basis of read-destination information included in the command.

(FIG. 7: Step S704)

The virtual function unit 611 (Vfx) transmits a read request in conformity with the PCIe specification to the CMIF 300 on the basis of the transfer-destination address of the read command received from the main processor 613.

(FIG. 7: Step S705)

The CMIF 300 reads data that CM 310 stores in accordance with the read request, forms the read data as a completion packet in conformity with the PCIe specification, and transfers it to the FEIF 200 via the non-transparent bridge 612 (NTx).

(FIG. 7: Step S706)

The virtual function unit 611 (VFx) receives the completion packet and transmits the read data included in the completion packet to the host system.

FIGS. 8 to 11 show the relationships between the main processors 10 to 13 (CPU0 to CPU3) and the multiple virtual function units (VF1 to VFn) in the SR-IOV device 231, respectively. As an example, the number of the virtual function units provided by the SR-IOV device 231 is assumed to be 28.

Figure 8:
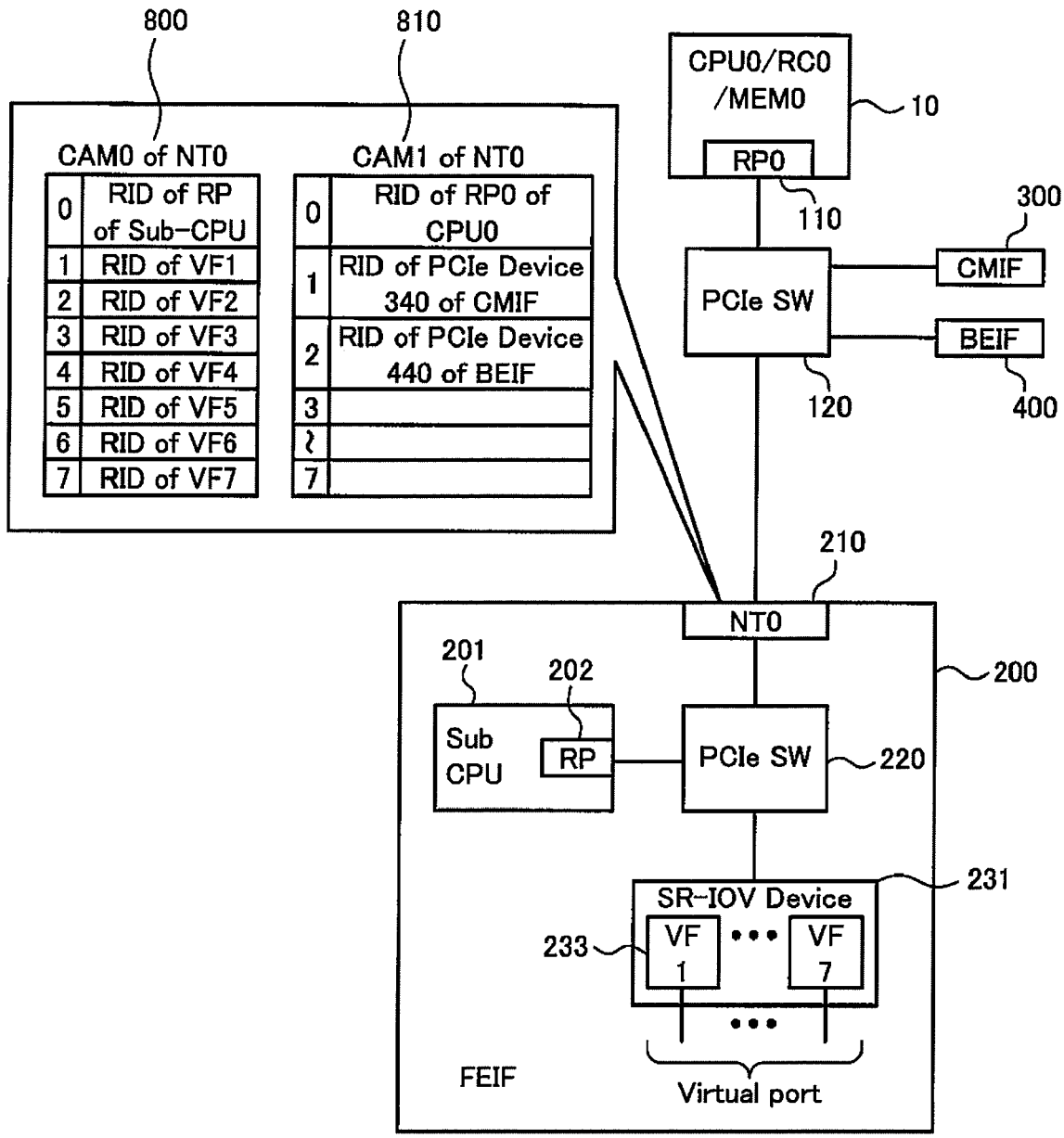
FIG. 8 is a diagram showing the internal configuration of the storage apparatus 100 viewed from a main processor 10 (CPU0).

FIG. 8 is a diagram showing the internal configuration of the storage apparatus 100 viewed from the main processor 10 (CPU0). The NTB 210 (NT0) includes an RID mapping table 800 for translating the requester ID of a request packet transmitted by the FEIF 200 and the requester ID of a completion packet which is a response thereto. The RID mapping table 800 stores the RID of the root port 202 of the sub-processor 201 and the RIDs of seven virtual function units (VF1 to VF7). The sub-processor 201 and the virtual function units (VF1 to VF7) can transmit a request packet to the main processor 10 (CPU0), the CMIF 300 and the BEIF 400 via the NTB 210.

The NTB 210 also includes an RID mapping table 810 for translating the requester ID of a request packet issued from the main processor 10 (CPU0), the PCIe devices in the CMIF 300, the PCIe devices in the BEIF 400 or the like, which are outside the FEIF 200, and the requester ID of a completion packet which is a response thereto. The RID mapping table 810 stores the RID of a root port 110 (RP0) of the main processor 10 (CPU0), the RID of a PCIe device 340 in the CMIF 300, and the RID of a PCIe device 440 in the BEIF 400. The main processor 10 (CPU0), the CMIF 300 and the BEIF 400 can transmit a request packet to the sub-processor 201 or the virtual function units 233 in the SR-IOV device 231, which are in the FEIF 200, via the NTB 210 (NT0).

Figure 9:
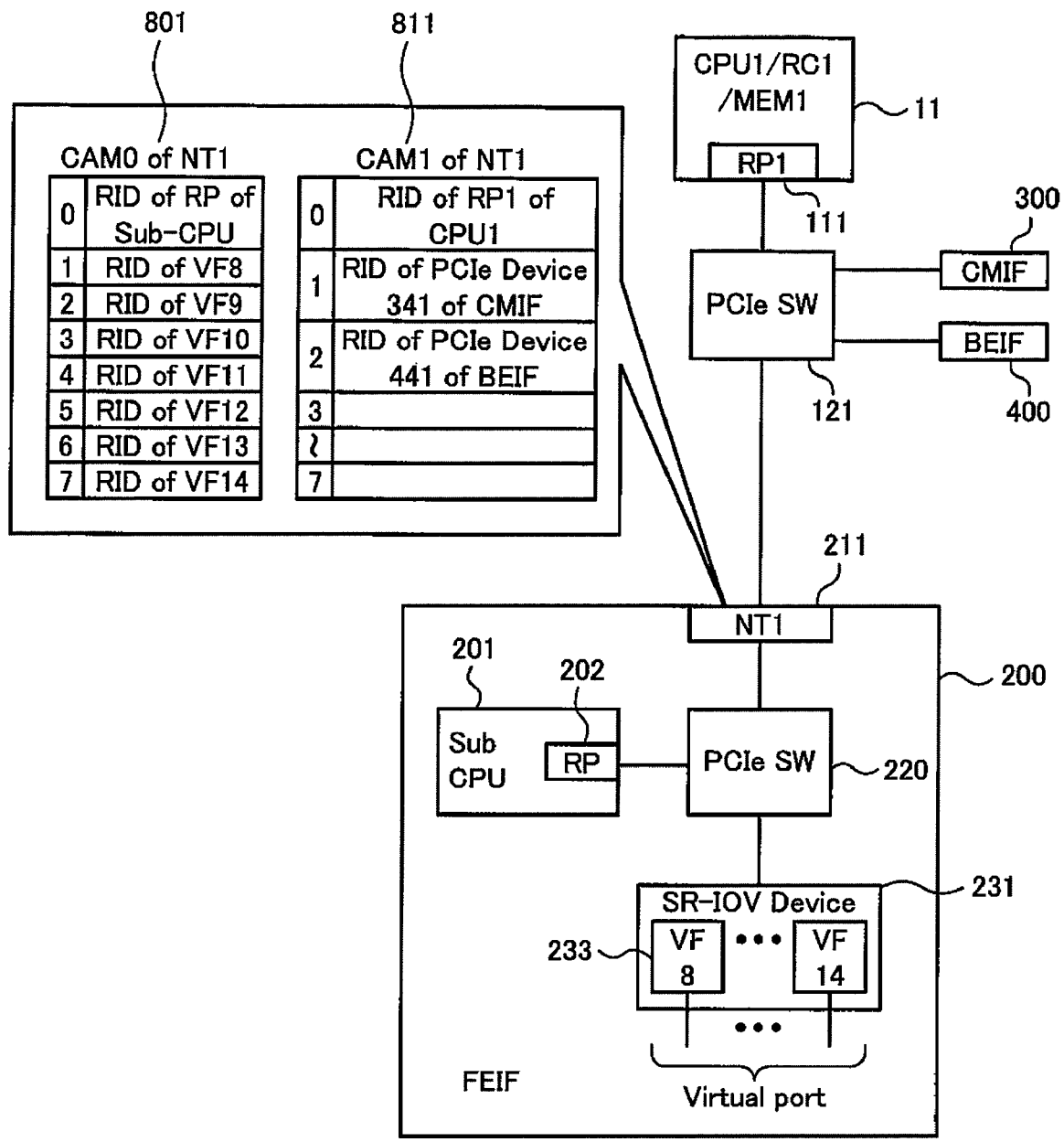
FIG. 9 is a diagram showing the internal configuration of the storage apparatus 100 viewed from a main processor 11 (CPU1).

FIG. 9 is a diagram showing the internal configuration of the storage apparatus 100 viewed from the main processor 11 (CPU1). The NTB 211 (NT1) is provided with an RID mapping table 801 for translating the requester ID of a request packet transmitted by the FEIF 200 and the requester ID of a completion packet which is a response thereto. The RID mapping table 801 stores the RID of the root port 202 of the sub-processor 201 and the RIDs of seven virtual function units (VF8 to VF14). The sub-processor 201 and the virtual function units (VF8 to VF14) can transmit a request packet to the main processor 11 (CPU 1), the CMIF 300 and the BEIF 400 via the NTB 211.

The NTB 211 also includes an RID mapping table 811 for translating the requester ID of a request packet issued from the main processor 11 (CPU1), the PCIe devices in the CMIF 300, the PCIe devices in the BEIF 400 or the like, which are outside the FEIF 200, and the requester ID of a completion packet which is a response thereto. The RID mapping table 811 stores the RID of a root port 111 (RP1) of the main processor 11 (CPU 1), the RID of a PCIe device 341 in the CMIF 300, and the RID of a PCIe device 441 in the BEIF 400. The main processor 11 (CPU1), the CMIF 300 and the BEIF 400 can transmit a request packet to the sub-processor 201 or the virtual function units 233 in the SR-IOV device 231, which are in the FEIF 200, via the NTB 211 (NT1).

Figure 10:
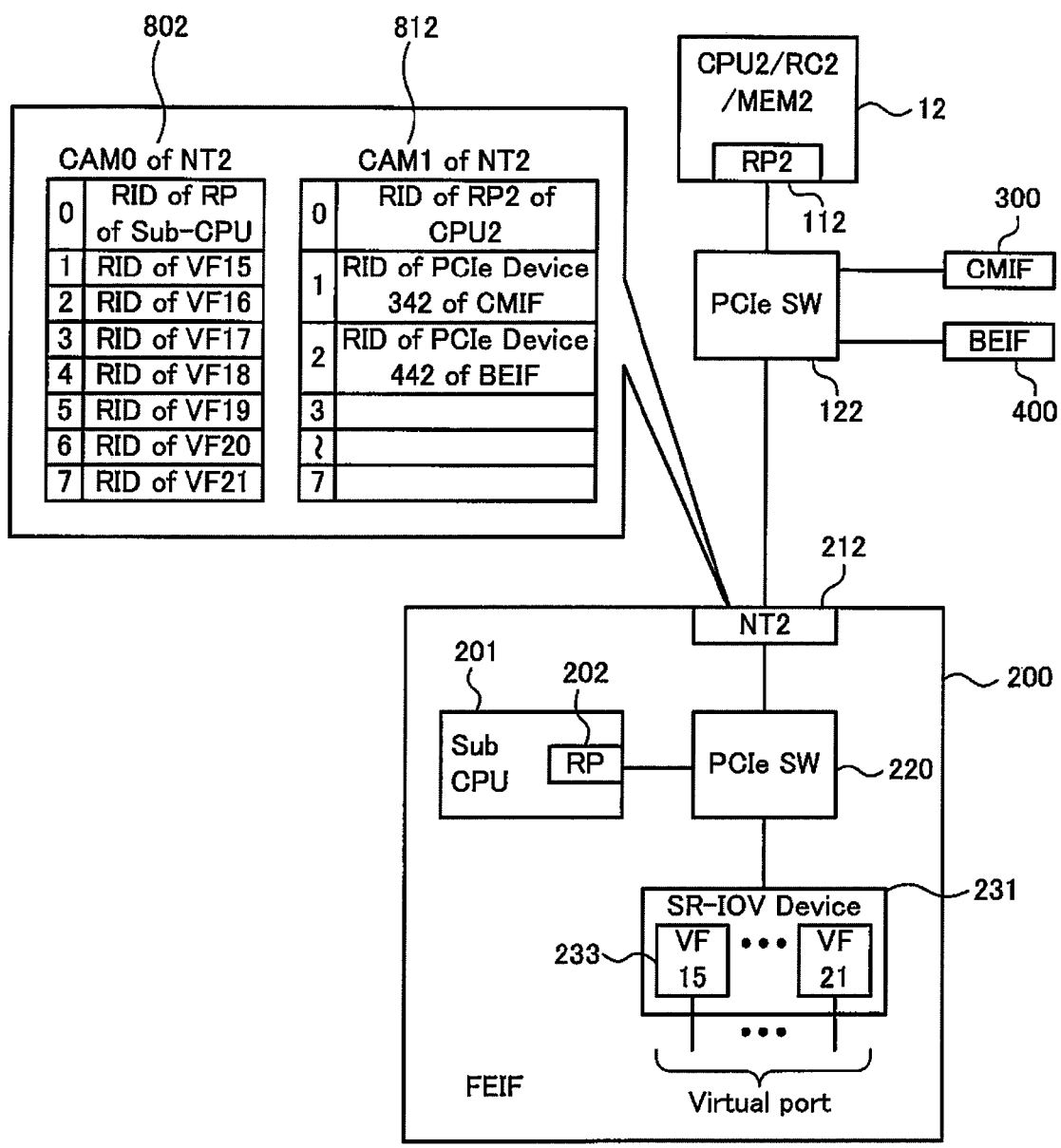
FIG. 10 is a diagram showing the internal configuration of the storage apparatus 100 viewed from a main processor 12 (CPU2).

FIG. 10 is a diagram showing the internal configuration of the storage apparatus 100 viewed from the main processor 12 (CPU2). The NTB 212 (NT2) is provided with an RID mapping table 802 for translating the requester ID of a request packet transmitted by the FEIF 200 and the requester ID of a completion packet which is a response thereto. The RID mapping table 802 stores the RID of the root port 202 of the sub-processor 201 and the RIDs of seven virtual function units (VF15 to VF21). The sub-processor 201 and the virtual function units (VF15 to VF21) can transmit a request packet to the main processor 12 (CPU2), the CMIF 300 and the BEIF 400 via the NTB 212.

The NTB 212 also includes an RID mapping table 812 for translating the requester ID of a request packet issued from the main processor 12 (CPU2), the PCIe devices in the CMIF 300, the PCIe devices in the BEIF 400 or the like, which are outside the FEIF 200, and the requester ID of a completion packet which is a response thereto. The RID mapping table 812 stores the RID of a root port 112 (RP2) of the main processor 12 (CPU2), the RID of a PCIe device 342 in the CMIF 300, and the RID of a PCIe device 442 in the BEIF 400. The main processor 12 (CPU2), the CMIF 300 and the BEIF 400 can transmit a request packet to the sub-processor 201 or the virtual function units 233 in the SR-IOV device 231, which are in the FEIF 200, via the NTB 212 (NT2).

Figure 11:
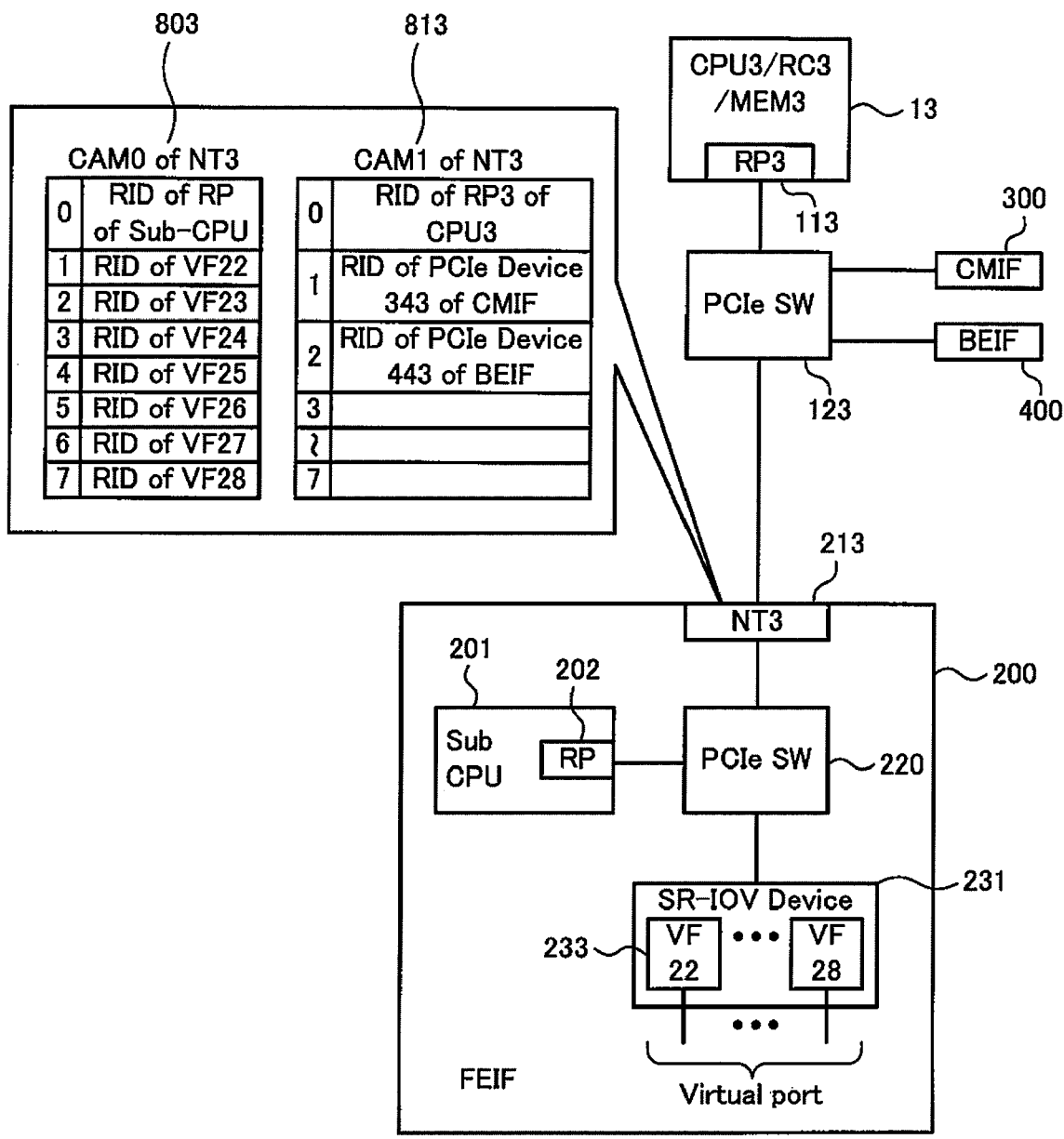
FIG. 11 is a diagram showing the internal configuration of the storage apparatus 100 viewed from a main processor 13 (CPU3).

FIG. 11 is a diagram showing the internal configuration of the storage apparatus 100 viewed from the main processor 13 (CPU3). The NTB 213 (NT3) is provided with an RID mapping table 803 for translating the requester ID of a request packet transmitted by the FEIF 200 and the requester ID of a completion packet which is a response thereto. The RID mapping table 803 stores the RID of the root port 202 of the sub-processor 201 and the RIDs of seven virtual function units (VF22 to VF28). The sub-processor 201 and the virtual function units (VF22 to VF28) can transmit a request packet to the main processor 13 (CPU3), the CMIF 300 and the BEIF 400 via the NTB 213.

The NTB 213 also includes an RID mapping table 813 for translating the requester ID of a request packet issued from the main processor 13 (CPU3), the PCIe devices in the CMIF 300, the PCIe devices in the BEIF 400 or the like, which are outside the FEIF 200, and the requester ID of a completion packet which is a response thereto. The RID mapping table 813 stores the RID of a root port 113 (RP3) of the main processor 13 (CPU3), the RID of a PCIe device 343 in the CMIF 300, and the RID of a PCIe device 443 in the BEIF 400. The main processor 13 (CPU3), the CMIF 300 and the BEIF 400 can transmit a request packet to the sub-processor 201 or the virtual function units 233 in the SR-IOV device 231, which are in the FEIF 200, via the NTB 213 (NT3).

FIGS. 8 to 11 show an example in which the RID mapping tables (800 to 803) hold different data. However, the RID mapping tables may hold the same data, for example, the RIDs of common virtual function units and the like. In this case, the same virtual function unit can be accessed from the main processors.

Figure 12:
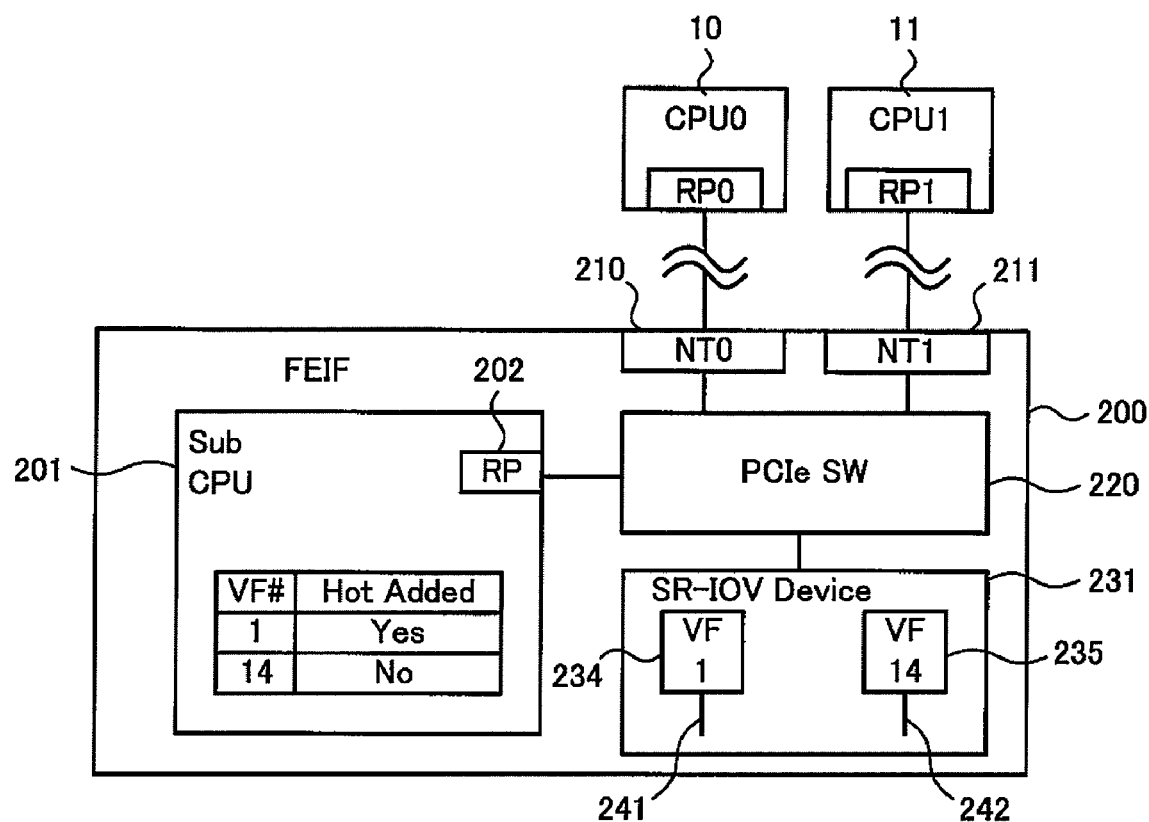
FIG. 12 is a diagram showing the state of the FEIF 200 before migration of a virtual port.
Figure 13:
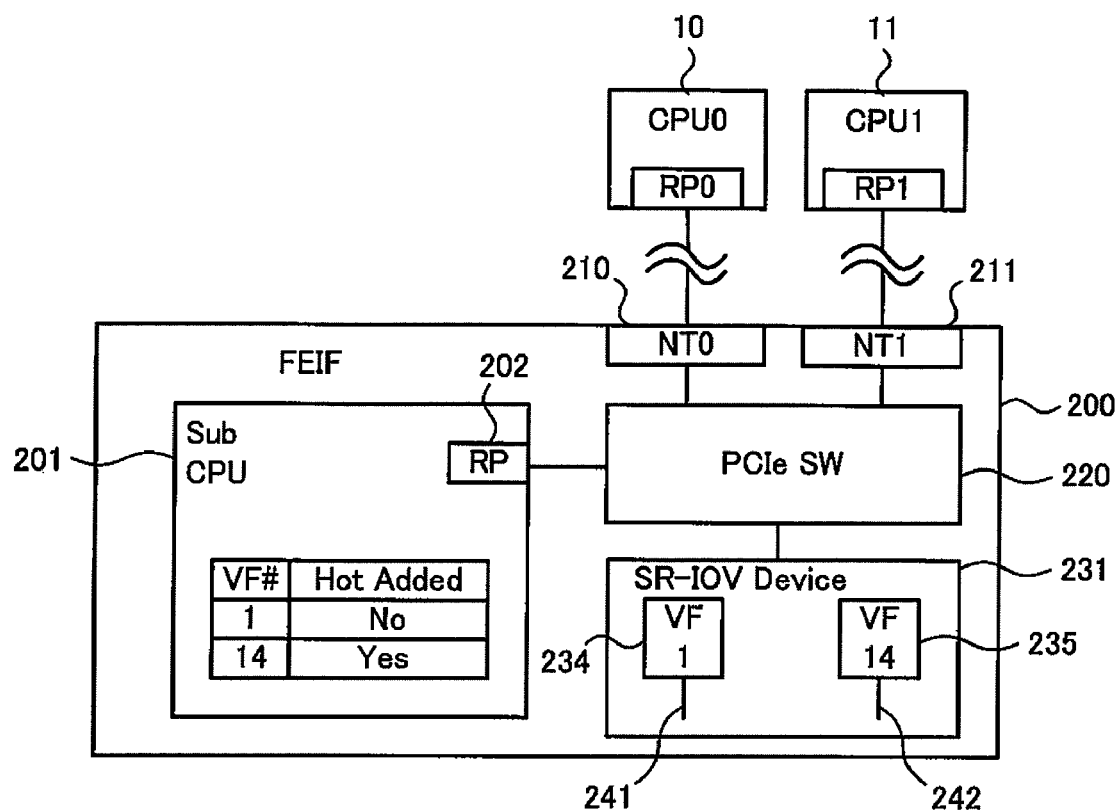
FIG. 13 is a diagram showing the state of the FEIF 200 after migration of the virtual port.
Figure 14:
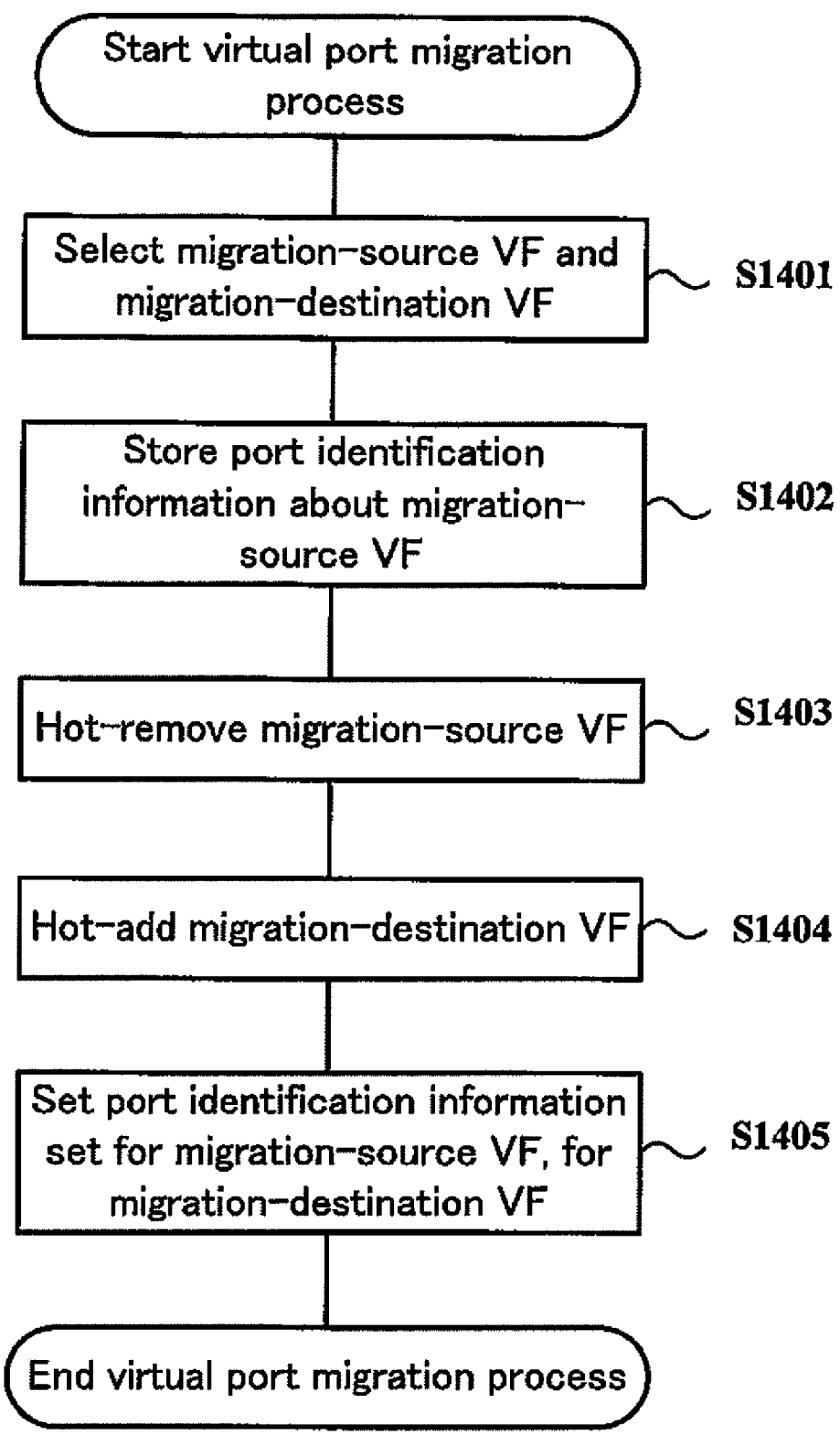
FIG. 14 is a flowchart of a virtual port migration process executed by the storage apparatus 100.

FIGS. 12 to 14 are diagrams illustrating virtual port migration in the storage apparatus 100 according to the first embodiment. Each virtual port has port identification information unique to the port. Virtual port migration means to migrate a virtual port between virtual function units, taking over the port identification information.

As an example, description will be made on an operation of migrating a virtual port from a virtual function unit 234 of the SR-IOV device 231 which the FEIF 200 includes, to a virtual function unit 235. An interface port provided by the virtual function unit 234 is referred to as a virtual port 241, and an interface port provided by the virtual function unit 235 is referred to as a virtual port 242.

The RID of the virtual function unit 234 (VF1) is registered with the RID mapping table 800 of the non-transparent bridge 210 (NT0), but the RID of the virtual function unit 235 (VF14) is not registered. Therefore, though the main processor 10 (CPU0) and the virtual function unit 234 can communicate with each other, the main processor 10 (CPU0) and the virtual function unit 235 cannot communicate with each other. Similarly, the RID of the virtual function unit 235 is registered with the RID mapping table 801 of the non-transparent bridge 211 (NT1), but the RID of the virtual function unit 234 is not registered. Therefore, though the main processor 11 (CPU1) and the virtual function unit 235 can communicate with each other, the main processor 11 (CPU1) and the virtual function unit 234 cannot communicate with each other.

The sub-processor 201 holds a device tree used to manage PCIe devices including the virtual function units 234 and 235 in its embedded memory. Here, to hot-add a virtual function unit means that the sub-processor 201 additionally registers the virtual function unit to the device tree and creates an instance of a device driver for the virtual function unit. To hot-remove a virtual function unit means that the sub-processor 201 cancels registration of the virtual function unit with the device tree and discards the instance of the device driver for the virtual function unit. By hot-adding a virtual function unit, the function of the virtual function unit can be enabled, and the enablement is canceled by performing hot-removing.

The enablement of a virtual function unit stated here refers to a process for enabling the virtual function unit to be used, and the specific procedure depends on the specification of the SR-IOV device 230 or the like. For example, if it is possible to additionally register a virtual function unit with the device tree and leave the virtual function unit without being enabled, the virtual function unit can be said not to have been enabled at that point of time.

FIG. 12 is a diagram showing the state of the FEIF 200 before migration of a virtual port. The sub-processor 201 has hot-added the virtual function unit 234 but has not hot-added the virtual function unit 235. As a result, though the main processor 10 (CPU0) can use the virtual port 241, the main processor 11 (CPU1) cannot use the virtual port 242. The sub-processor 201 sets port identification information for each hot-added virtual port so that the virtual port can be used with the use of various communication protocols. As this port identification information, for example, a WWPN (World-Wide Port Name) assigned to each port of a Fiber Channel interface, a MAC address (Media Access Control address) assigned to each Ethernet interface or the like can be used. The sub-processor 201 sets port identification information for the virtual function unit 234 which has been hot-added but does not set port identification information for the virtual function unit 235 which has not been hot-added.

FIG. 13 is a diagram showing the state of the FEIF 200 after migration of a virtual port. The sub-processor 201 has hot-added the virtual function unit 235 but has not hot-added the virtual function unit 234. The sub-processor 201 sets port identification information for the virtual function unit 235 which has been hot-added but does not set port identification information for the virtual function unit 234 which has not been hot-added. As a result, though the main processor 11 (CPU1) can use the virtual port 242, the main processor 10 (CPU0) cannot use the virtual port 241.

The sub-processor 201 sets the port identification information set for the virtual function unit 234 before execution of the migration process, for the virtual function unit 235 which has been hot-added. Thereby, the port identification information is taken over from the virtual function unit 234 to the virtual function unit 235. Since the virtual function unit 234 and the virtual function unit 235 share a physical port, it appears to a host system outside the storage apparatus 100 that the same port is used before and after the migration of the virtual port. That is, it appears that any physical change has not occurred between before and after the migration of the virtual port when viewed from the outside of the storage apparatus 100. However, inside the storage apparatus 100, the main processor for controlling data transfer can be changed (in the above example, from the main processor 10 (CPU0) to the main processor 11 (CPU1)).

By performing the virtual port migration described above, it is possible to, when the load of a certain main processor increases, migrate a virtual port which has been used by the main processor to a virtual function unit which can be used by another main processor with a low load. Thereby, load balancing inside the storage apparatus 100 can be performed. It is also possible to, when a fault occurs in a virtual hierarchy to which a certain main processor belongs, migrate a virtual port which has been used by the main processor to a virtual function unit which can be used by another normal main processor. Thereby, fail-over processing inside the storage apparatus 100 can be performed.

FIG. 14 is a flowchart of the virtual port migration process executed by the storage apparatus 100. Each step in FIG. 14 will be described below.

(FIG. 14: Step S1401)

The administrator of the storage apparatus 100 selects a virtual function unit to be a migration source and a virtual function unit to be a migration destination, and inputs a result of the selection and a migration execution instruction to the management terminal 102. The virtual function unit to be a migration source is a virtual function unit which has been hot-added by the sub-processor 201, and the virtual function unit to be a migration destination is a virtual function unit which has not been hot-added by the sub-processor 201. If there is not a virtual function unit which has not been hot-added, a virtual function unit the use frequency of which is low or a virtual function unit which is not to be used in the future may be hot-removed and assigned as the migration-destination virtual function unit.

(FIG. 14: Step S1402)

The sub-processor 201 stores port identification information set for the migration-source virtual function unit into a predetermined area in the embedded memory. Next, the sub-processor 201 notifies the main processor 10 (CPU0) that the virtual port 241 will be disabled. Which main processor the notification should be issued to from the sub-processor 201 can be identified by referring to an NTB management table 1500 to be described later with reference to FIG. 15.

(FIG. 14: Step S1403)

The sub-processor 201 hot-removes the migration-source virtual function unit. Specifically, the sub-processor 201 cancels registration of the migration-source virtual function unit with the device tree and discards the instance of a device driver for the migration-source virtual function unit.

(FIG. 14: Step S1404)

The sub-processor 201 hot-adds the migration-destination virtual function unit. Specifically, the sub-processor 201 additionally registers the migration-destination virtual function unit with the device tree and creates the instance of a device driver for the migration-destination virtual function unit.

(FIG. 14: Step S1405)

The sub-processor 201 sets the port identification information set for the migration-source virtual function unit, for the migration-destination virtual function unit. The sub-processor 201 notifies the main processor 11 (CPU1) that the virtual port 242 has been enabled for use. Which main processor the notification should be issued to from the sub-processor 201 can be identified by referring to the NTB management table 1500 to be described later with reference to FIG. 15. This completes the virtual port migration process.

FIG. 15 is a diagram showing the configuration of the NTB management table 1500 managed by the sub-processor 201 and a data example. Only a part of the data example is illustrated for convenience of description. The NTB management table 1500 is a table for the sub-processor 201 side to recognize the contents equal to the contents of the mapping table held by each NTB. The sub-processor 201 holds the NTB management table 1500 in a suitable storage device such as an embedded memory. The contents of the NTB management table 1500 can be set when the storage apparatus 100 is activated or initialized.

By referring to the NTB management table 1500, the sub-processor 201 can check the contents of the RID mapping tables 800 to 803 set for the NTBs of the FEIF 200 and correspondence relationships among the main processors, the root ports of the main processors and virtual function units in the FEIF 200.

The NTB management table 1500 has an NTB number field 1501, an RID mapping table entry number field 1502, a CPU number field 1503, an RP number field 1504 and a VF number field 1505.

The NTB number field 1501 holds the identification number of an NTB. The RID mapping table entry number field 1502 holds the index number of any of the RID mapping tables 800 to 803 of the NTB identified by the value of the NTB number field 1501. The CPU number field 1503 holds identification information about a main processor which can communicate with a virtual function unit in the FEIF 200 via the NTB identified by the value of the NTB number field 1501. The RP number field 1504 holds identification information about the root port of the main processor. The VF number field 1505 holds a number for identifying a virtual function unit with which the root port identified by the value of the RP number field 1504 can communicate, in the device tree.

FIG. 16 is a diagram showing the configuration of a virtual port management table 1600 managed by the sub-processor 201 and a data example. Only a part of the data example is illustrated for convenience of description. The virtual port management table 1600 is a table for managing the state of each virtual port. The sub-processor 201 holds the virtual port management table 1600 in a suitable storage device such as an embedded memory. The contents of the virtual port management table 1600 can be set when the storage apparatus 100 is activated or initialized.

The virtual port management table 1600 has a VF number field 1601, a VF RID field 1602, a VF state field 1603, a port identification information field 1604 and a migration-destination VF number field 1605.

The VF number field 1601 holds a number for identifying a virtual function unit in the device tree. The VF RID field 1602 holds the RID of a virtual function unit identified by the value of the VF number field 1601. The VF state field 1603 holds a state value indicating whether the virtual function unit identified by the value of the VF number field 1601 has been hot-added or not. The port identification information field 1604 holds port identification information (for example, a WWPN) to be set when the virtual function unit identified by the value of the VF number field 1601 is hot-added. The migration-destination VF number field 1605 holds a number identifying a migration-destination virtual function unit in the case of migrating a virtual port provided by the virtual function unit identified by the value of the VF number field 1601.

When the administrator manually specifies the migration-destination virtual function unit, he may not use the value of this field.

When executing the virtual port migration process described with reference to FIG. 14, the sub-processor 201 changes each of the value of the VF state field 1603, the value of the port identification information field 1604 and the value of the migration-destination VF number field 1605 according to the state after migration.

First Embodiment: Summary

As described above, the storage apparatus 100 according to the first embodiment enables any of virtual function units provided by the SR-IOV device 230 which the FEIF 200 includes and leaves any of the other virtual function units without being enabled. The main processors 10 to 13 communicate with the enabled virtual function unit via a non-transparent bridge. Thereby, even in the case of providing a virtual port using an SR-IOV device in the FEIF, it is possible to take over a function between virtual ports and share the virtual port among the main processors. Furthermore, since the above function is realized with the use of an SR-IOV device, the cost of the storage apparatus 100 can be reduced.

When canceling enablement of a virtual function unit and newly enabling another virtual function unit, the storage apparatus 100 according to the first embodiment causes port identification information about the enablement-canceled virtual function unit to be taken over by the new virtual function unit and migrates a virtual port. Thereby, since it appears to the main processor that the same virtual port continues the operation, the process before the migration of the virtual port can be seamlessly taken over.

The storage apparatus 100 according to the first embodiment connects the main processors and the virtual function units via the non-transparent bridges. Thereby, data can be transferred between PCIe trees having different root ports.

The storage apparatus 100 according to the first embodiment includes a non-transparent bridge management table in which connection relationships between the non-transparent bridges and the main processors are described. When newly enabling a virtual function unit, the sub-processor can refer to the non-transparent bridge management table to identify a main processor which can communicate with the virtual function unit to be newly enabled and issue a notification to that effect. Thereby, it is possible to automatically switch the main processor when migrating a virtual port and, therefore, perform load balancing of the storage apparatus 100.

Second Embodiment

In a second embodiment of the present invention, description will be made on an operation example in which, when a fault occurs in a virtual function unit related to a certain main processor, the virtual port which has been used by the main processor where the fault occurred is migrated to a main processor of a normal virtual hierarchy. Since the configuration of the storage apparatus 100 is almost similar to that of the first embodiment, different points will be mainly described below.

Figure 17:
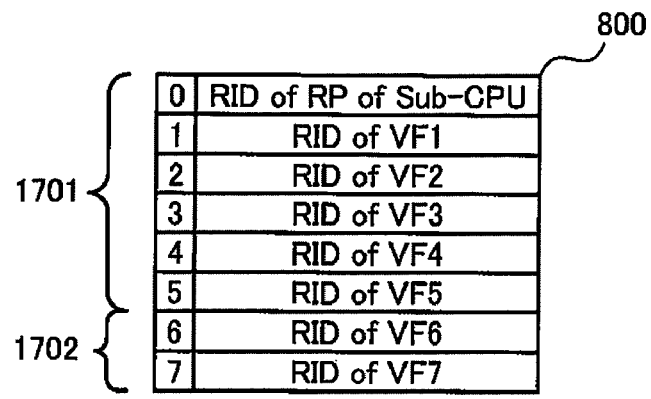
FIG. 17 is a diagram showing a configuration example of an RID mapping table 800 of a non-transparent bridge 210 (NT0).

FIG. 17 is a diagram showing a configuration example of the RID mapping table 800 of the non-transparent bridge 210 (NT0). This table is used for a request packet transmitted by the sub-processor 201 and the virtual function units in the FEIF 200 to the main processor 10 (CPU0) side beyond the NTB 210 (NT0), and a completion packet which is a response thereto.

Among the RIDs of the virtual function units registered with the RID mapping table 800 shown in FIG. 17, five (VF1 to VF5) are in a state of having been hot-added by the sub-processor 201 (1701), and two (VF6 and VF7) are in a state of not having been hot-added (1702). That is, the main processor 10 (CPU0) can use virtual ports provided by the five virtual function units (VF1 to VF5) but cannot use virtual ports provided by the two virtual function units (VF6 to VF7).

Figure 18:
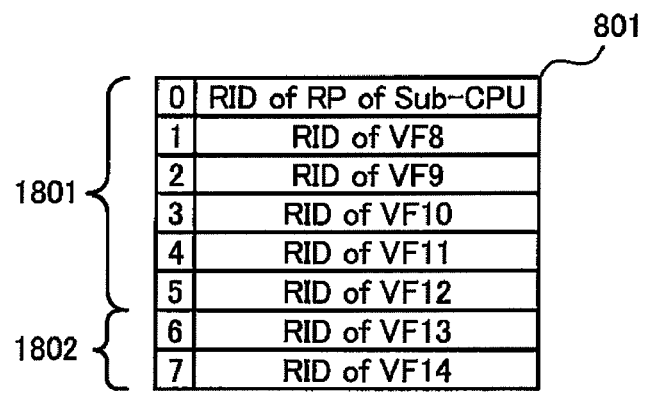
FIG. 18 is a diagram showing a configuration example of an RID mapping table 801 of a non-transparent bridge 211 (NT1).

FIG. 18 is a diagram showing a configuration example of the RID mapping table 801 of the non-transparent bridge 211 (NT1). This table is used for a request packet transmitted by the sub-processor 201 and the virtual function units in the FEIF 200 to the main processor 11 (CPU 1) side beyond the NTB 211 (NT1), and a completion packet which is a response thereto.

Among the RIDs of the virtual function units registered with the RID mapping table 801 shown in FIG. 18, five (VF8 to VF12) are in a state of having been hot-added by the sub-processor 201 (1801), and two (VF13 and VF14) are in a state of not having been hot-added (1802). That is, the main processor 11 (CPU1) can use virtual ports provided by the five virtual function units (VF8 to VF12) but cannot use virtual ports provided by the two virtual function units (VF13 to VF14).

Figure 19:
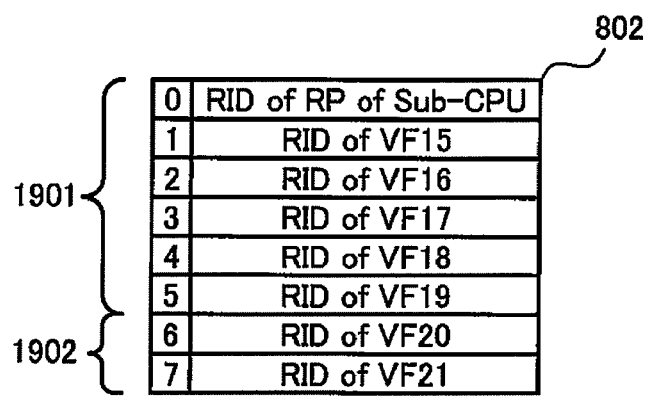
FIG. 19 is a diagram showing a configuration example of an RID mapping table 802 of a non-transparent bridge 212 (NT2).

FIG. 19 is a diagram showing a configuration example of the RID mapping table 802 of the non-transparent bridge 212 (NT2). This table is used for a request packet transmitted by the sub-processor 201 and the virtual function units in the FEIF 200 to the main processor 12 (CPU2) side beyond the NTB 212 (NT2), and a completion packet which is a response thereto.

Among the RIDs of the virtual function units registered with the RID mapping table 802 shown in FIG. 19, five (VF15 to VF19) are in a state of having been hot-added by the sub-processor 201 (1901), and two (VF20 and VF21) are in a state of not having been hot-added (1902). That is, the main processor 12 (CPU2) can use virtual ports provided by the five virtual function units (VF15 to VF19) but cannot use virtual ports provided by the two virtual function units (VF20 to VF21).

Figures 20, 21:
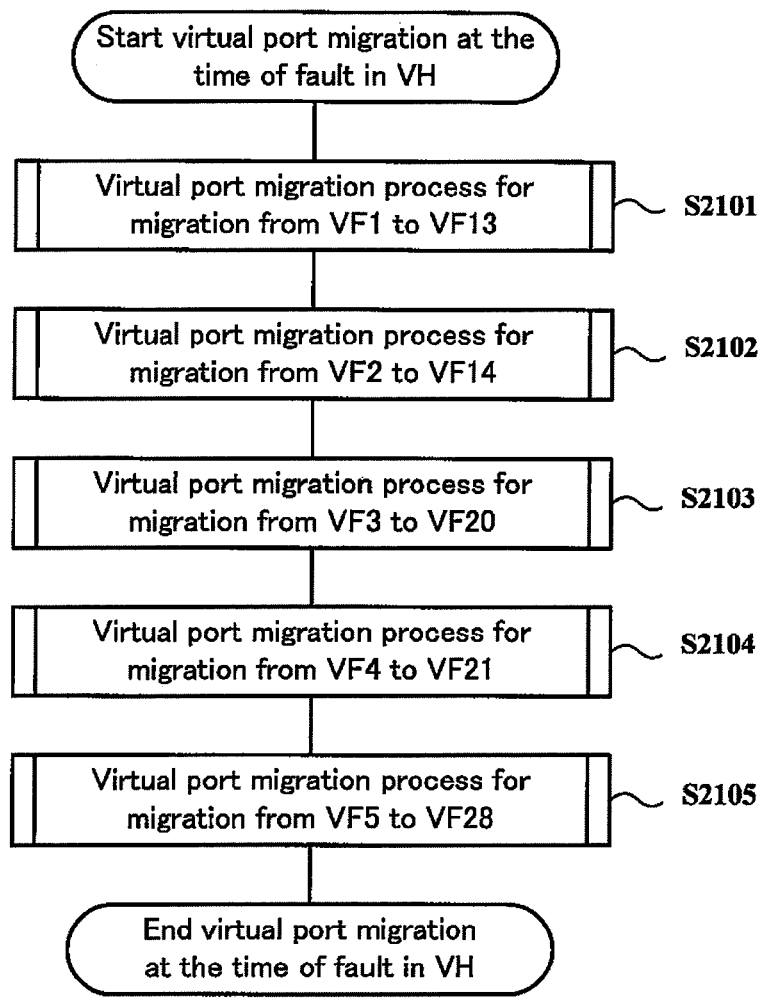
FIG. 20 is a diagram showing a configuration example of an RID mapping table 803 of a non-transparent bridge 213 (NT3).
FIG. 21 is a flowchart of a virtual port migration process in the case where a fault occurs in a virtual hierarchy related to a certain main processor.

FIG. 20 is a diagram showing a configuration example of the RID mapping table 803 of the non-transparent bridge 213 (NT3). This table is used for a request packet transmitted by the sub-processor 201 and the virtual function units in the FEIF 200 to the main processor 13 (CPU3) side beyond the NTB 213 (NT3), and a completion packet which is a response thereto.

Among the RIDs of the virtual function units registered with the RID mapping table 803 shown in FIG. 20, five (VF22 to VF26) are in a state of having been hot-added by the sub-processor 201 (2001), and two (VF27 and VF28) are in a state of not having been hot-added (2002). That is, the main processor 13 (CPU3) can use virtual ports provided by the five virtual function units (VF22 to VF26) but cannot use virtual ports provided by the two virtual function units (VF27 to VF28).

As shown in FIGS. 17 to 20, the RIDs of five virtual function units hot-added by the sub-processor 201 and the RIDs of two virtual function units which have not been hot-added are registered with the RID mapping tables 800 to 803 of the NTBs 210 to 213 in the second embodiment. If a fault occurs in a virtual hierarchy related to a certain main processor, the virtual port migration process described in the first embodiment is performed between the five virtual function units hot-added by the sub-processor 201 and the virtual function units related to the other normal main processors which have not been hot-added.

FIG. 21 is a flowchart of the virtual port migration process in the case where a fault occurs in a virtual hierarchy related to a certain main processor. Here, it is assumed that a fault has occurred in the virtual hierarchy of the main processor 10

(CPU0) as an example. In this case, the five virtual ports provided by the virtual function units VF1 to VF5 are migrated to any of the virtual function units VF13, VF14, VF20, VF21, VF27 and VF28.

For example, the sub-processor 201 executes a process for migrating the virtual port from the virtual function unit VF1 to the virtual function unit VF13 first (S2101). The process procedure is similar to FIG. 14 of the first embodiment. Next, the sub-processor 201 executes a virtual port migration process for migration from the virtual function unit VF2 to the virtual function unit VF14 (S2102). Next, the sub-processor 201 executes a virtual port migration process for migration from the virtual function unit VF3 to the virtual function unit VF20 (S2103). Next, the sub-processor 201 executes a virtual port migration process for migration from the virtual function unit VF4 to the virtual function unit VF21 (S2104). Lastly, the sub-processor 201 executes a virtual port migration process for migration from the virtual function unit VF5 to the virtual function unit VF28 (S2105).

Second Embodiment: Summary

As described above, the storage apparatus 100 according to the second embodiment registers the RIDs of a predetermined number of virtual function units which have not been hot-added by the sub-processor 201, with the RID mapping table 800 to 803 of the NTBs 210 to 213. Thereby, when a fault occurs in a virtual hierarchy related to a certain main processor, the sub-processor 201 can perform a virtual port migration process for migrating the virtual ports (used by the main processor) related to the virtual hierarchy where the fault has occurred to virtual function units which can be used by the main processors of normal virtual hierarchies. That is, when an internal fault occurs in the storage apparatus 100, it is possible to perform a fail-over process quickly.

In the second embodiment, it is recommended that, when the number of NTBs which the FEIF 200 includes is assumed to be N, the number of hot-added virtual function units to be registered with one NTB should be equal to or smaller than the number of not yet hot-added virtual function units to be registered with one NTB multiplied by (N−1). The number of hot-added virtual function units to be registered with one NTB means the number of virtual ports which can be used by one main processor. Thereby, when a fault occurs in a virtual function unit, all the virtual ports can be migrated to other virtual function units which have not been hot-added, and therefore, it is possible to equally maintain the performance of the storage apparatus 100 before and after the migration of the virtual ports.

Third Embodiment

In a third embodiment of the present invention, description will be made on a configuration example in which, when migrating a virtual port, the administrator can select whether or not to migrate the physical port at the same time and whether or not to migrate the main processor at the same time. Since the configuration of the storage apparatus 100 is almost similar to that of the first and second embodiments, different points will be mainly described below.

Figure 22:
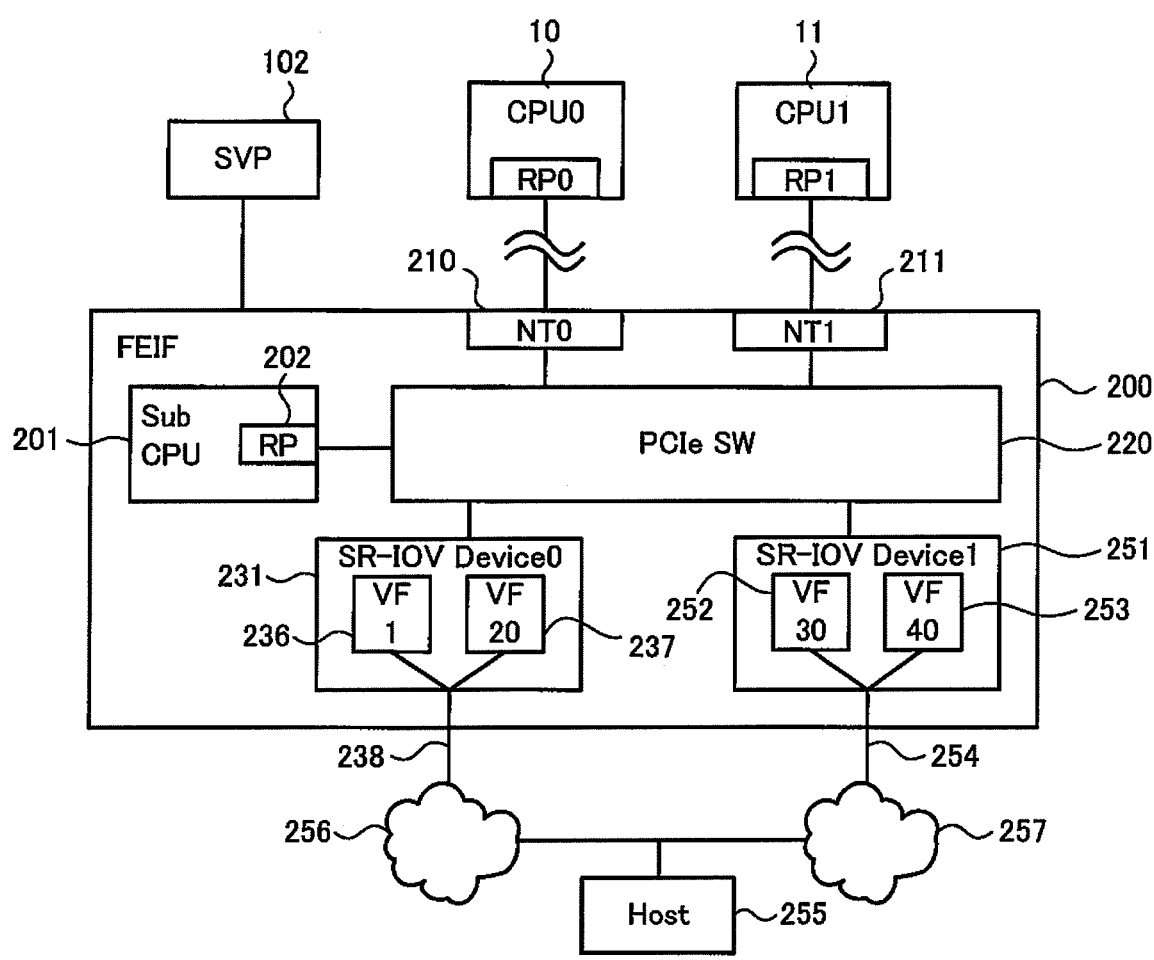
FIG. 22 is a diagram showing the internal configuration of the FEIF 200 provided with multiple physical ports and a connection relationship with a host system 255.

FIG. 22 is a diagram showing the internal configuration of the FEIF 200 provided with multiple physical ports and a connection relationship with a host system 255. The host system 255 is connected to a physical port 238 of the FEIF 200 via an external network 256. The host system 255 is also connected to a physical port 254 of the FEIF 200 via an external network 257.

The FEIF 200 includes two SR-IOV devices 231 and 251. The SR-IOV device 231 is provided with virtual function units 236 (VF1) and 237 (VF20), and the physical port 238. The virtual function units 236 (VF1) and 237 (VF20) share the physical port 238. The SR-IOV device 251 includes virtual function units 252 (VF30) and 253 (VF40), and the physical port 254. The virtual function units 252 (VF30) and 253 (VF40) share the physical port 254.

In the SR-IOV device 231, the sub-processor 201 has hot-added the virtual function unit 236 (VF1) and has not hot-added the virtual function unit 237 (VF20). In the SR-IOV device 251, the sub-processor 201 has hot-added the virtual function unit 252 (VF30) and has not hot-added the virtual function unit 253 (VF40).

Even between different SR-IOV devices, that is, even between different physical ports, a virtual port can be migrated. For example, the case of migrating a virtual port from the virtual function unit 236 (VF1) to the virtual function unit 253 (VF40) corresponds thereto. The storage apparatus 100 according to the third embodiment can execute both of virtual port migration in which the main processor is changed without changing the physical port similarly to the first and second embodiments and virtual port migration in which the migration-destination physical port of a virtual port is changed from the physical port before migration.

During a normal operation, the host system 255 accesses the FEIF 200 via the external network 256 and the physical port 238. If a fault occurs in the external network 256 or the network load increases, the host system 255 switches the access route to the storage apparatus 100 so as to access the FEIF 200 via the external network 257 and the physical port 254.

In order to realize this access route switching, the virtual port can be migrated from the virtual function unit 236 (VF1) to the virtual function unit 253 (VF40). In this case, change of the physical port occurs. The virtual port provided by the virtual function unit 253 takes over port identification information about the virtual port provided by the virtual function unit 236. Therefore, even if the physical port is changed between before and after the virtual port migration, it appears to the host system 255 that it accesses the same port of the storage apparatus 100.

Figure 23:
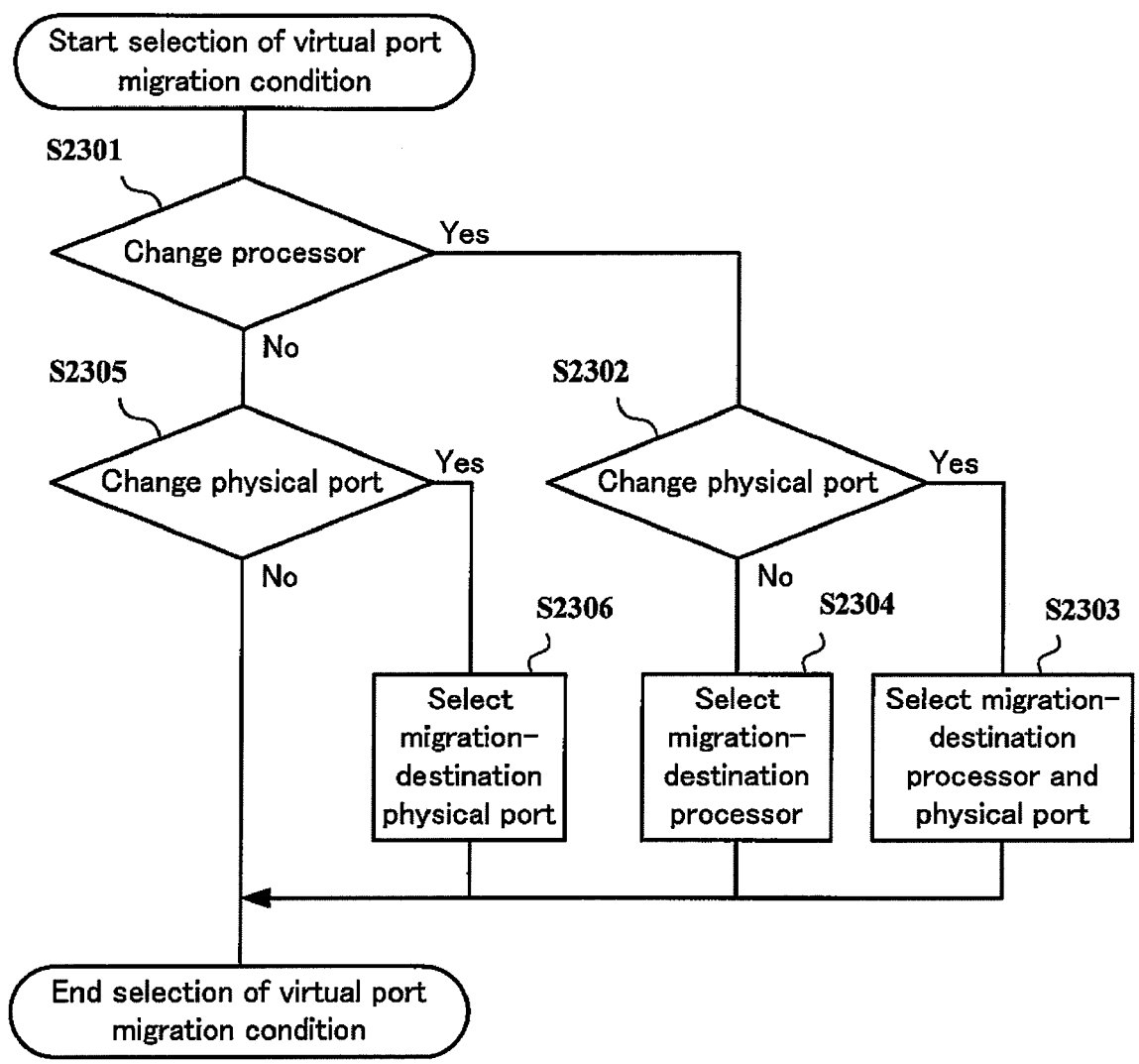
FIG. 23 is a flowchart of a process for selecting a virtual port migration condition.

FIG. 23 is a flowchart of a process for selecting a virtual port migration condition. In this process flow, it is judged whether change of the physical port should accompany migration of a virtual port and whether change of the main processor should accompany or not. Each step in FIG. 23 will be described below.

(FIG. 23: Step S2301)

The administrator of the storage apparatus 100 selects whether or not to change the main processor for executing an I/O process after migration of a virtual port between before and after the migration of the virtual port, on a virtual port migration condition selection screen to be described later with reference to FIG. 24. The management terminal 102 receives a result of the selection. If the main processor is to be changed, the flow proceeds to step S2302. If it is not to be changed, the flow proceeds to step S2305.

(FIG. 23: Step S2302)

The administrator of the storage apparatus 100 selects whether or not to change the physical port between before and after the migration of the virtual port. If the physical port is to be changed, the flow proceeds to step S2303. If it is not to be changed, the flow proceeds to step S2304.

(FIG. 23: Steps S2303 and S2304)

If the main processor and the physical port are to be changed, the administrator of the storage apparatus 100 selects a migration-destination main processor and physical port (S2303). If only the main processor is to be changed, the administrator selects a migration-destination main processor (S2304). A virtual port migration in which a main processor is changed requires that an RID mapping table of an NTB associated with a migration-destination main processor stores an RID of a virtual function unit without being enabled. The management terminal 102 notifies a result of the selection to the sub-processor 201.

(FIG. 23: Step S2305)

The administrator of the storage apparatus 100 selects whether or not to change the physical port between before and after the migration of the virtual port. If the physical port is to be changed, the flow proceeds to step S2306. If it is not to be changed, the operation flow ends.

(FIG. 23: Step S2306)

The administrator of the storage apparatus 100 selects a migration-destination physical port. A virtual port migration in which only a physical port is changed requires that an RID mapping table of an NTB associated with a migration-source virtual function unit stores an RID of a virtual function unit without being enabled. The management terminal 102 notifies a result of the selection to the sub-processor 201.

Figure 24:
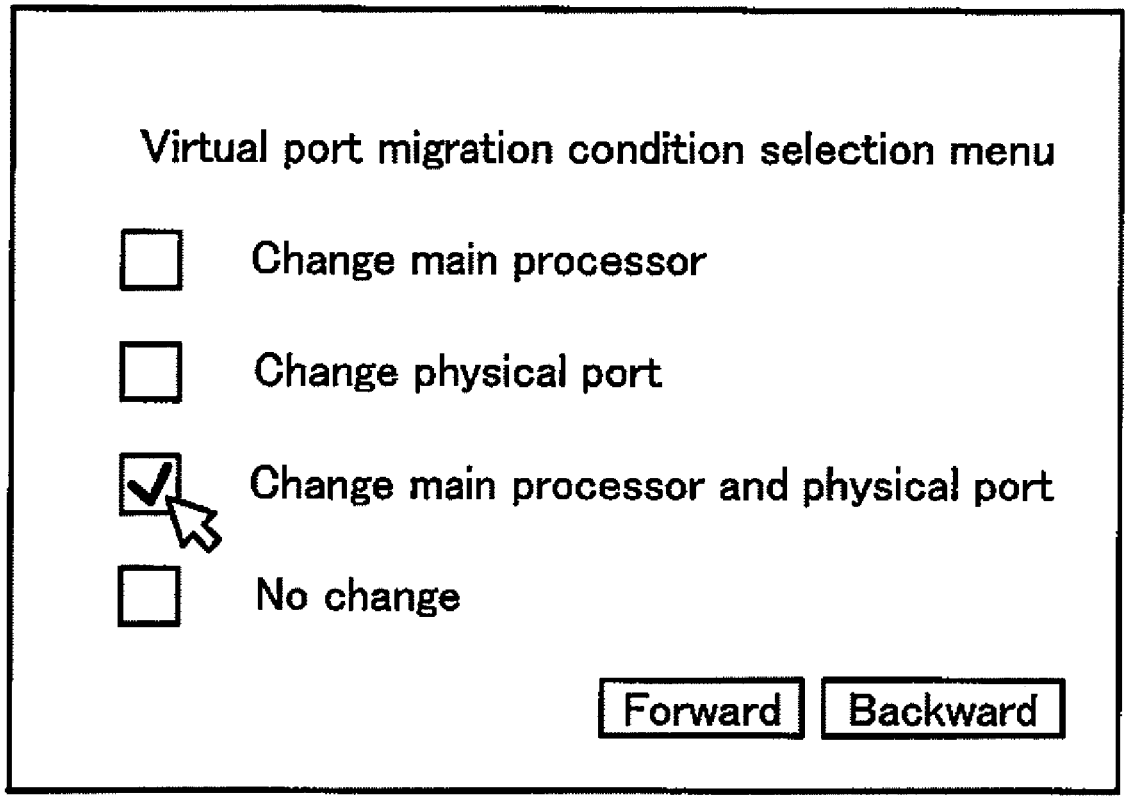
FIG. 24 is a diagram showing an example of a virtual port migration condition selection screen for an administrator of the storage apparatus 100 to select a virtual port migration condition.

FIG. 24 is a diagram showing an example of the virtual port migration condition selection screen for the administrator of the storage apparatus 100 to select a virtual port migration condition. The management terminal 102 displays this screen on the display device such as a display. On this screen, "Change main processor", "Change physical port", "Change main processor and physical port" and "No change" are shown as selectable menu items. The administrator of the storage apparatus 100 can select a virtual port migration condition from this selection menu.

Third Embodiment: Summary

As described above, the storage apparatus 100 according to the third embodiment presents to the administrator a screen for selecting a virtual port migration condition on the management terminal 102. The administrator can select whether or not to change the main processor and physical port in charge of an I/O process after migration of a virtual port. Thereby, it is possible to switch the main processor and the physical port while continuing the process by the storage apparatus 100 in accordance with the operation state or work schedule of the storage apparatus 100.

Fourth Embodiment

In a fourth embodiment of the present invention, description will be made on an example of configuring a network in the storage apparatus 100 using an MRA (multi-root aware) switch. Since the procedure for the virtual port migration process is similar to that of the first to third embodiments, different points related to the MRA switch will be mainly described below.

Figure 25:
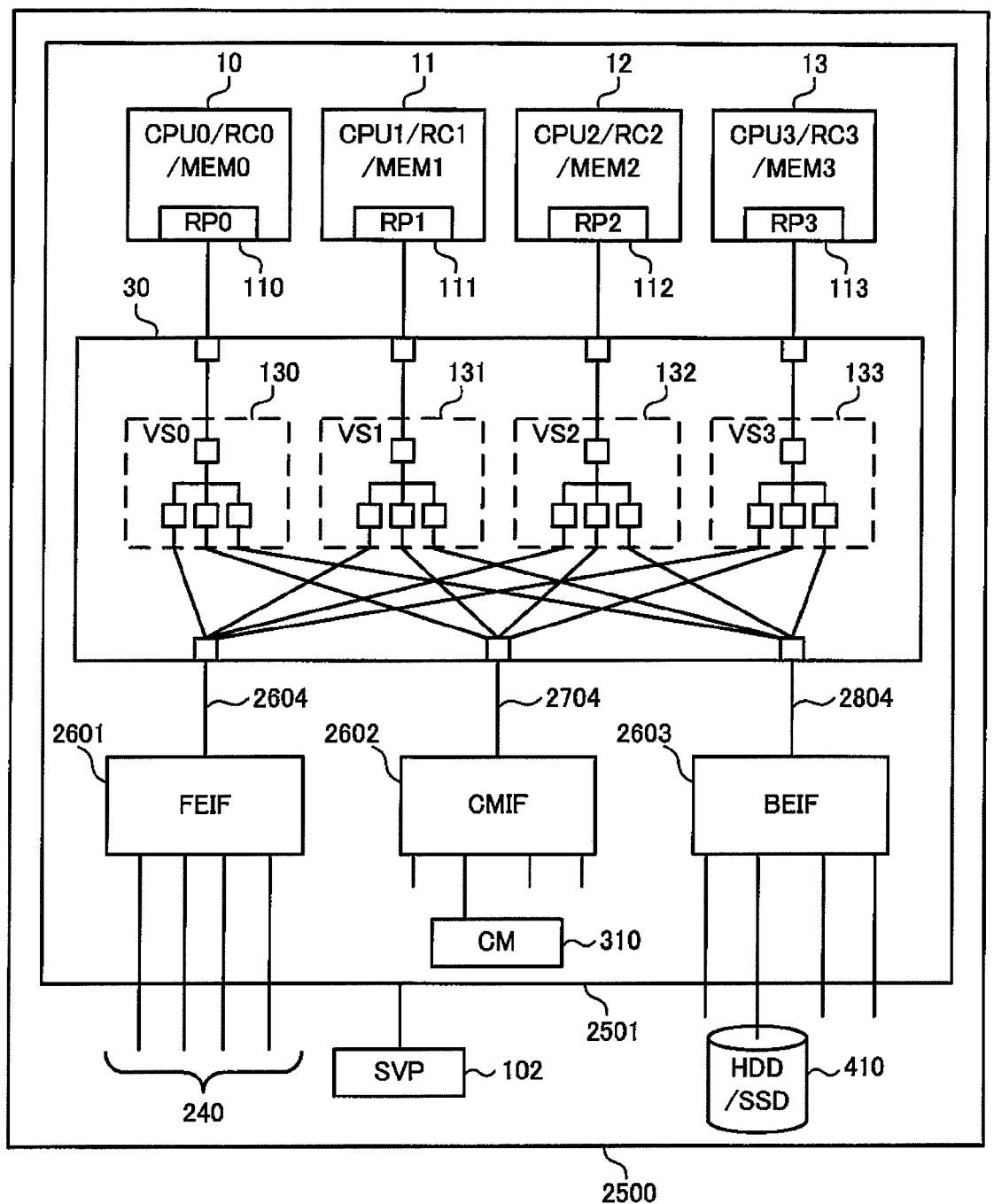
FIG. 25 is a functional block diagram of a storage apparatus 2500 according to a fourth embodiment.

FIG. 25 is a functional block diagram of a storage apparatus 2500 according to the fourth embodiment. The storage apparatus 2500 includes a storage controller 2501 instead of the storage controller 101. The storage controller 2501 includes an FEIF 2601, a CMIF 2602 and a BEIF 2603 instead of the FEIF 200, the CMIF 300 and the BEIF 400. The storage controller 2501 includes an MRA switch 30 instead of the PCIe switches 120 to 123.

The storage controller 2501 connects the main processors 10 to 13 (CPU0 to CPU3), and the FEIF 2601, the CMIF 2602 and the BEIF 2603 using the MRA switch 30.

The MRA switch 30 is a switch in conformity with the MR-IOV specification. The MRA switch 30 includes multiple virtual switches 130 to 133 (VS0 to VS3) inside. The virtual switches 130 to 133 (VS0 to VS3) play roles equal to the roles of the PCIe switches 120 to 123 (SW0 to SW3) in FIG. 1, respectively. The MRA switch 30 and the interfaces (the FEIF 2601, the CMIF 2602 and the BEIF 2603) are connected via MR-links 2604, 2704 and 2804, respectively. Each MR-link can be shared by multiple virtual hierarchies as a data transfer path. Thereby, the number of physical links connecting the MRA switch 30 and the storage interfaces (the FEIF 2601, the CMIF 2602 and the BEIF 2603) can be reduced.

Figure 26:
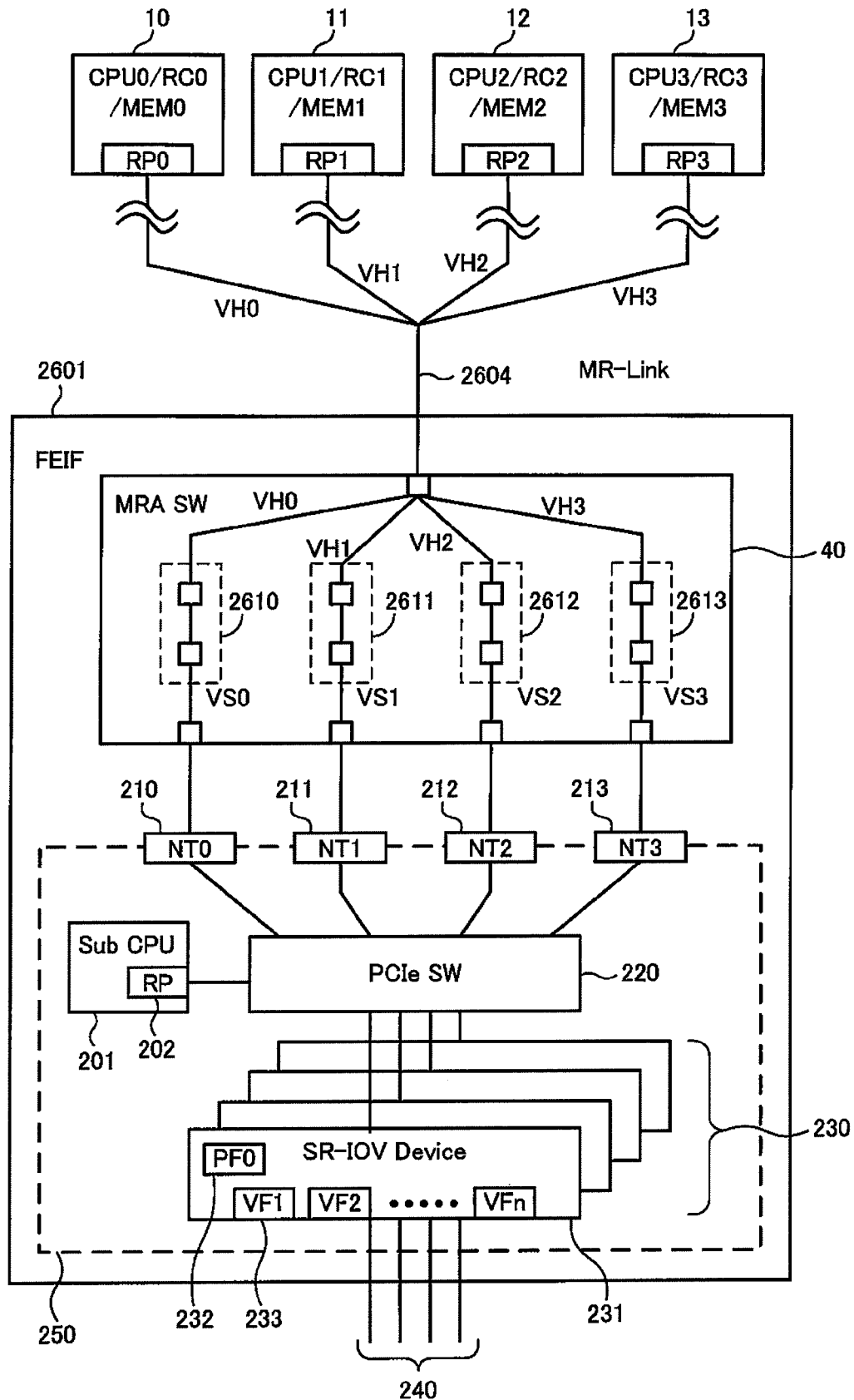
FIG. 26 is a diagram showing the internal configuration of an FEIF 2601.

FIG. 26 is a diagram showing the internal configuration of the FEIF 2601. In comparison with the FEIF 200 in FIG. 2, the FEIF 2601 differs in that it additionally includes an MRA switch 40.

The MRA switch 40 includes multiple virtual switches 2610 to 2613 (VS0 to VS3) inside. The MRA switch 40 sorts packets belonging to multiple virtual hierarchies, which are data-transferred on the MR-link 2604, by virtual hierarchy, and transfers them to the NTBs 210 to 213 (NT0 to NT3). The MRA switch 40 also transfers a packet inputted via each of the NTBs 210 to 213 (NT0 to NT3) to the MR-link 2604 as a packet belonging to a different virtual hierarchy according to the NTB it has passed.

Figure 27:
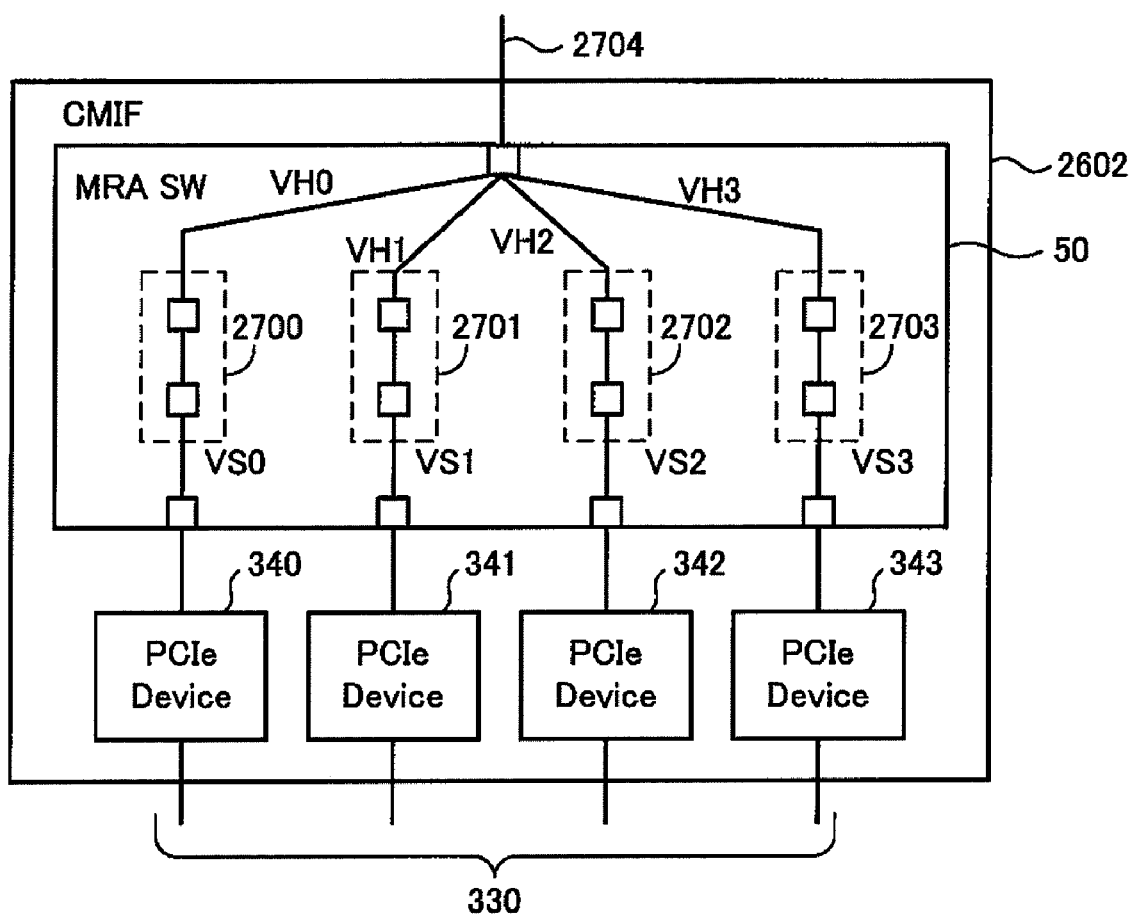
FIG. 27 is a diagram showing the internal configuration of a CMIF 2602.

FIG. 27 is a diagram showing the internal configuration of the CMIF 2602. In comparison with the CMIF 300 in FIG. 3, the CMIF 2602 differs in that it additionally includes an MRA switch 50.

The MRA switch 50 includes multiple virtual switches 2700 to 2703 (VS0 to VS3) inside. The MRA switch 50 sorts packets belonging to multiple virtual hierarchies, which are data-transferred on the MR-link 2704, by virtual hierarchy, and transfers them to the PCIe devices 340 to 343. The MRA switch 50 also transfers a packet inputted from each of the PCIe devices 340 to 343 to the MR-link 2704 as a packet belonging to a different virtual hierarchy according to the transmission-source PCIe device.

Figure 28:
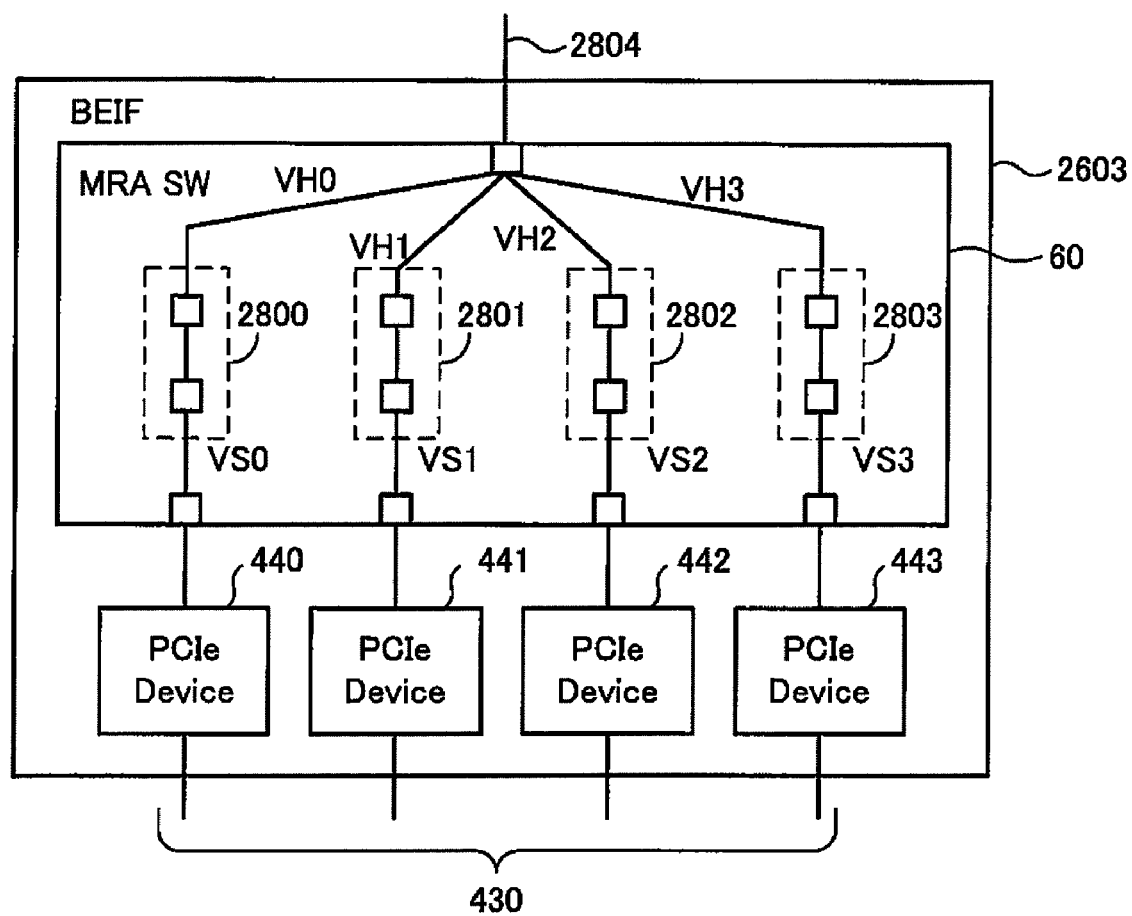
FIG. 28 is a diagram showing the internal configuration of a BEIF 2603.

FIG. 28 is a diagram showing the internal configuration of the BEIF 2603. In comparison with the BEIF 400 in FIG. 4, the BEIF 2603 differs in that it additionally includes an MRA switch 60.

The MRA switch 60 includes multiple virtual switches 2800 to 2803 (VS0 to VS3) inside. The MRA switch 60 sorts packets belonging to multiple virtual hierarchies, which are data-transferred on the MR-link 2804, by virtual hierarchy and transfers them to the PCIe devices 440 to 443. The MRA switch 60 also transfers a packet inputted from each of the PCIe devices 440 to 443 to the MR-link 2804 as a packet belonging to a different virtual hierarchy according to the transmission-source PCIe device.

In addition to the above configuration, the storage apparatus 2500 includes an MR-PCIM (Multi-Root PCI Manager) 3001. The MR-PCIM is a computer program having a function for performing setting and management of internal networks (including MRA switches and MR-links) of the storage controller 2501 specified in the MR-IOV. The MR-PCIM is stored in one or more of the memories (MEM0 to MEM3) which the storage controller 2501 includes. The main processors 10 to 13 (CPU0 to CPU3) connected to the memories (MEM0 to MEM3) execute the MR-PCIM stored in the memories. Alternatively, the MR-PCIM may be includes in the management terminal 102. The MR-PCIM collects and manages information about errors and faults which have occurred in the internal networks of the storage controller 2501.

Figure 29:
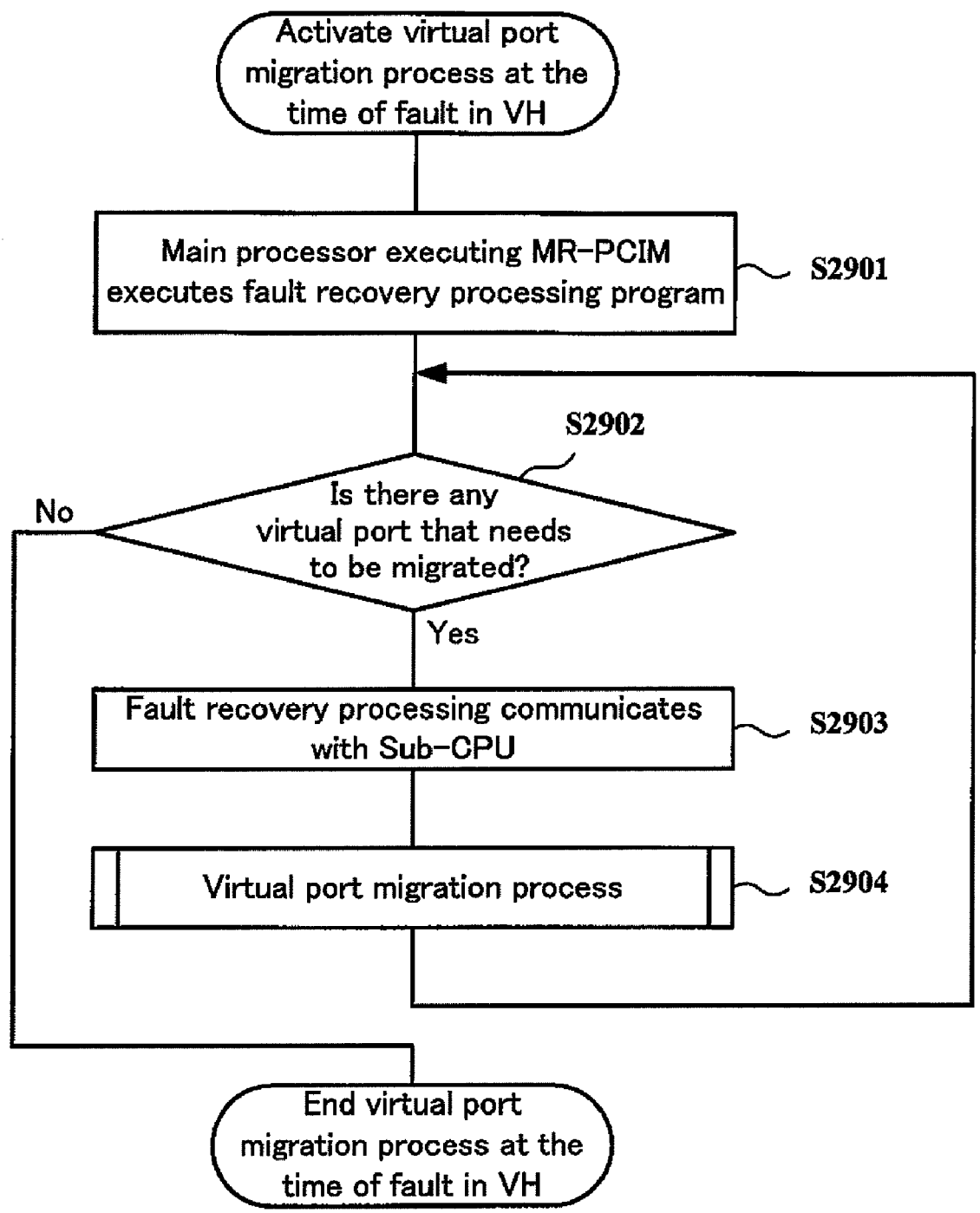
FIG. 29 is a flowchart of a fault recovery process in the case where a fault occurs in a virtual hierarchy related to a certain main processor.

FIG. 29 is a flowchart of a fault recovery process in the case where a fault occurs in a virtual hierarchy related to a certain main processor. Each step in FIG. 29 will be described below.

(FIG. 29: Step S2901)

A main processor of a normal virtual hierarchy executing the MR-PCIM (any of the main processors 10 to 13) detects occurrence of a fault in a certain virtual hierarchy. The main processor executes a fault recovery processing program.

(FIG. 29: Step S2902)

The main processor executing the fault recovery processing program judges whether there is a virtual port that needs to be migrated. If there is such a virtual port, the flow proceeds to step S2903. If not, the operation flow ends.

(FIG. 29: Step S2902: Supplementation)

Whether it is necessary to migrate a virtual port or not can be judged, for example, on the basis of whether a virtual port which a main processor cannot use due to occurrence of a fault has occurred or not.

(FIG. 29: Steps S2903 and S2904)

The main processor executing the fault recovery processing program instructs the sub-processor 201 to execute the virtual port migration process for the FEIF 2601. Then, the sub-processor 201 executes the virtual port migration process in accordance with the procedure described in any of the first to third embodiments. After this step ends, the flow returns to step S2902, and a similar process is repeated.

Figure 30:
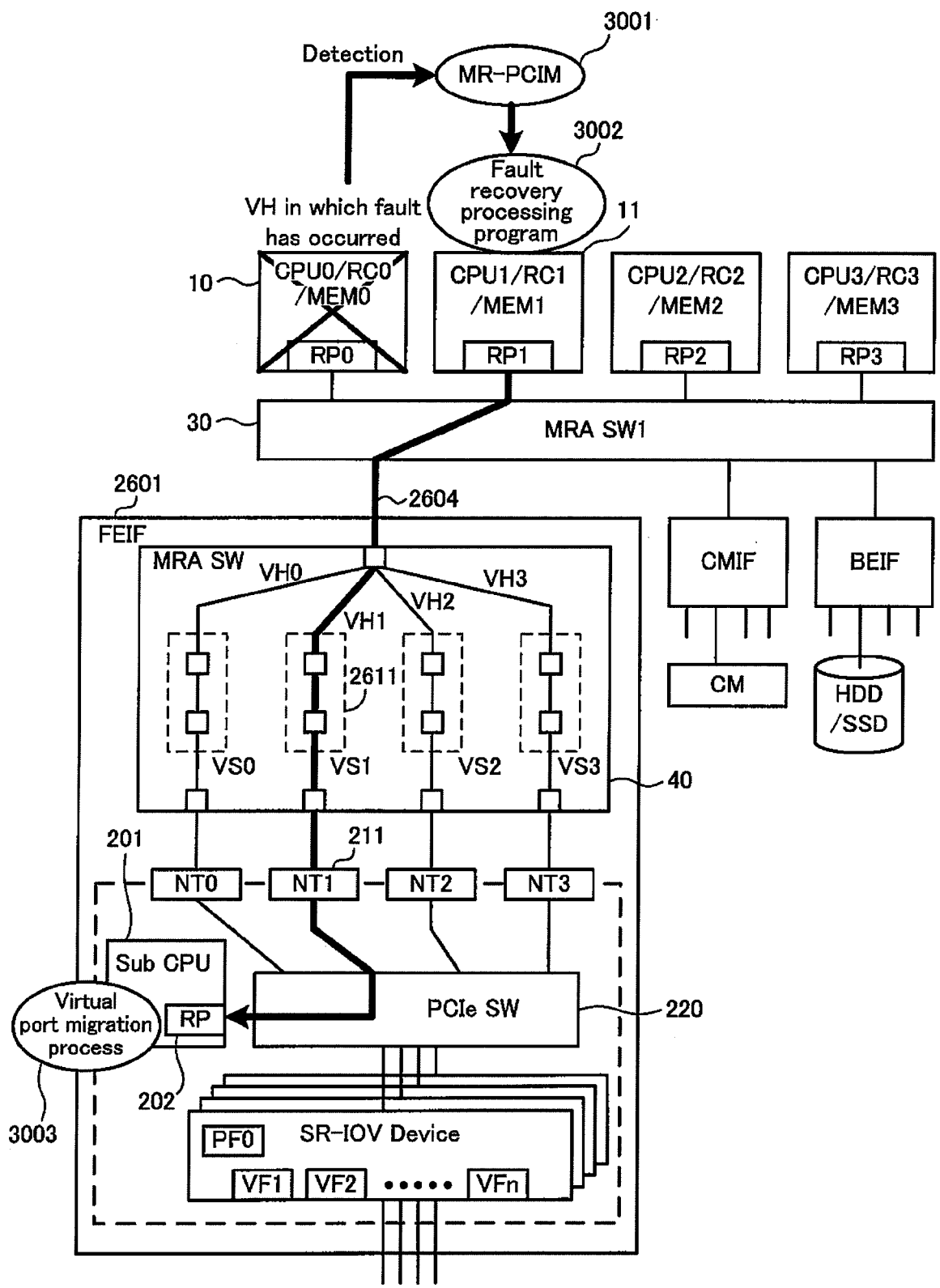
FIG. 30 is a diagram showing an information communication flow at the time of processing of a fault inside the storage apparatus 2500.

FIG. 30 is a diagram showing an information communication flow at the time of processing of a fault inside the storage apparatus 2500. Here, it is assumed that a fault which has occurred in a virtual hierarchy to which the main processor 10 (CPU0) belongs is detected by the main processor 11 (CPU1) executing the MR-PCIM 3001.

The main processor 11 (CPU1) activates a fault recovery processing program 3002. The main processor 11 (CPU1) executing the fault recovery processing program 3002 communicates with the sub-processor 201 via the MRA switch 30, the MR-link 2604, a virtual switch 2611 in the MRA switch 40, the NTB 211, the PCIe switch 220 and the root port 202 of the sub-processor 201, and instructs the sub-processor 201 to execute the virtual port migration process. In accordance with the instruction, the sub-processor 201 executes a virtual port migration process 3003 described in any of the first to third embodiments.

Fourth Embodiment: Summary

As described above, in the storage apparatus 2500 according to the fourth embodiment, any of the main processors 10 to 13 executes the MR-PCIM 3001 and detects that a fault has occurred in a virtual hierarchy to which another main processor belongs to. The main processor which has detected the fault instructs the sub-processor 201 to execute the virtual port migration process via a virtual hierarchy operating normally. Thereby, the fault recovery process of the storage apparatus 2500 can be automated.

Furthermore, according to the storage apparatus 2500 according to the fourth embodiment, it is possible to aggregate networks in the storage apparatus 2500 with a small number of links by using an MRA switch. Thereby, it is possible to simplify the network configuration in the storage apparatus 2500.

In the fourth embodiment, it has been described that a main processor executes the MR-PCIM 3001 to detect occurrence of a fault related to another main processor, and instructs a sub-processor to migrate the virtual port. The MR-PCIM is in accordance with the specification unique to the MR-IOV. However, it is also possible to make such a configuration that, in the other embodiments, a program having similar functions is provided to detect occurrence of a fault related to a main processor and instruct a sub-processor to execute migration of a virtual port similarly to the fourth embodiment.

The configuration using an MRA switch described in the fourth embodiment can be adopted under the configuration of each of the first to third embodiments.

Fifth Embodiment

In a fifth embodiment of the present invention, description will be made on the configuration of a storage apparatus in which internal networks are redundant. Since the procedure for the virtual port migration process is similar to that of the first to fourth embodiments, different points related to the redundancy will be mainly described below.

Figure 31:
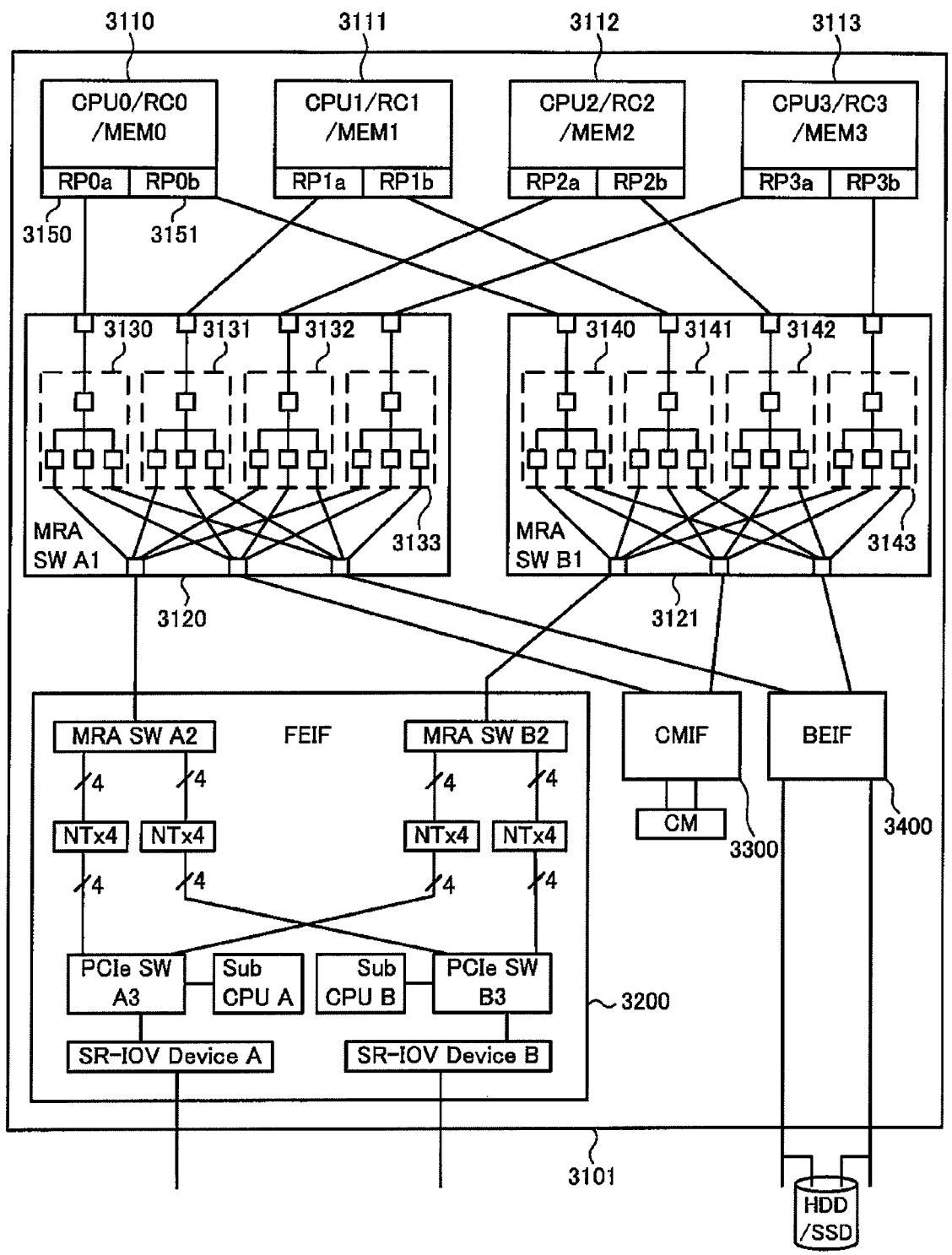
FIG. 31 is a diagram showing the configuration of a storage controller 3101 in which internal networks are redundant.

FIG. 31 is a diagram showing the configuration of a storage controller 3101 in which internal networks are redundant. The storage controller 3101 includes main processors 3110 to 3113 (CPU0 to CPU3), MRA switches 3120 and 3121, an FEIF 3200, a CMIF 3300 and a BEIF 3400.

Each of the main processors 3110 to 3113 (CPU0 to CPU3) includes two root ports. For example, the main processor 3110 (CPU0) includes root ports 3150 (RP0a) and 3151 (RP0b). The two root ports of each of the main processors 3110 to 3113 (CPU0 to CPU3) are connected to the MRA switch 3120 or 3121.

The MRA switch 3120 includes four virtual switches 3130 to 3133. Similarly, the MRA switch 3121 includes four virtual switches 3140 to 3143.

The main processor 3110 (CPU0) can access each of the storage interfaces (the FEIF 3200, the CMIF 3300 and the BEIF 3400) via the root port 3150 (RP0a) and the MRA switch 3120. The main processor 3110 (CPU0) can also access each of the storage interfaces (the FEIF 3200, the CMIF 3300 and the BEIF 3400) via the root port 3151 (RP0b) and the MRA switch 3121. The other main processors 3111 to 3113 (CPU1 to CPU3) can similarly access each of the storage interfaces (the FEIF 3200, the CMIF 3300 and the BEIF 3400) via the two root ports and the two MRA switches (3120 and 3121).

The route for access from each main processor to each storage interface is duplicated (redundant) as described above. Therefore, for example, even if a fault occurs in the MRA switch 3120, each main processor can access each storage interface via the MRA switch 3121.

Figure 32:
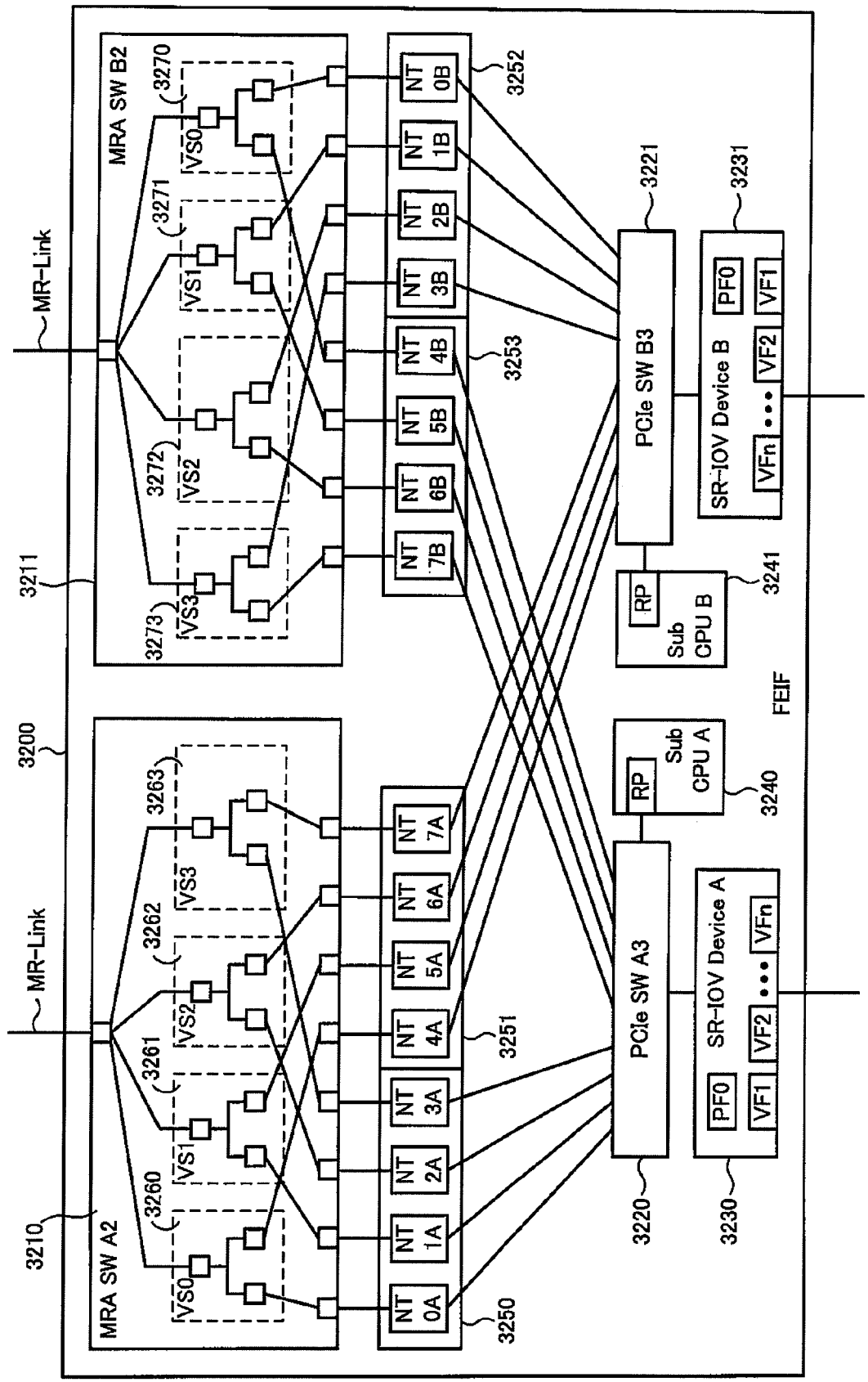
FIG. 32 is a diagram showing the internal configuration of an FEIF 3200.

FIG. 32 is a diagram showing the internal configuration of the FEIF 3200. The FEIF 3200 includes two front-end interfaces corresponding to the FEIF 2601 in FIG. 26. One is constituted by a sub-processor 3240, a PCIe switch 3220, an SR-IOV device 3230, an MRA switch 3210 and an NTB array 3250. The other is constituted by a sub-processor 3241, a PCIe switch 3221, an SR-IOV device 3231, an MRA switch 3211 and an NTB array 3252.

The MRA switch 3210 includes four virtual switches 3260 to 3263. Similarly, the MRA switch 3211 includes four virtual switches 3270 to 3273. Each of the virtual switches (3260 to 3263, and 3270 to 3273) includes two downstream bridges. The MRA switch 3210 connects to the PCIe switch 3221 via an NTB array 3251. The MRA switch 3211 connects to the PCIe switch 3220 via an NTB array 3253.

The NTB array 3250 includes four NTBs (NT0A, NT1A, NT2A and NT3A). The NTB array 3251 includes four NTBs (NT4A, NT5A, NT6A and NT7A). The NTB array 3252 includes four NTBs (NT0B, NT1B, NT2B and NT3B). The NTB array 3253 includes four NTBs (NT4B, NT5B, NT6B and NT7B).

As for the RID mapping tables for translating the RIDs of a request packet issued by the virtual function units of the SR-IOV devices (3230 and 3231) or the sub-processors (3240 and 3241) and a completion packet which is a response thereto, the RID mapping tables of the four NTBs (NT0A, NT1A, NT2A and NT3A) in the NTB array 3250 are set so that the contents are the same as the RID mapping tables of the four NTBs (NT4B, NT5B, NT6B and NT7B) in the NTB array 3253, respectively. Similarly, the RID mapping tables of the four NTBs (NT4A, NT5A, NT6A and NT7A) in the NTB array 3251 are set so that the contents are the same as the RID mapping tables of the four NTBs (NT0B, NT1B, NT2B and NT3B) in the NTB array 3252, respectively.

By setting the RID mapping table of each NTB as described above, the virtual function units in the SR-IOV device 3230 can communicate with each main processor using two routes. One is a route for accessing each main processor via the NTB array 3250, the MRA switch 3210 and the MRA switch 3120. The other is a route for accessing each main processor via the NTB array 3253, the MRA switch 3211 and the MRA switch 3121.

Similarly, the virtual function units in the SR-IOV device 3231 can communicate with each main processor using two routes. One is a route for accessing each main processor via the NTB array 3252, the MRA switch 3211 and the MRA switch 3121. The other is a route for accessing each main processor via the NTB array 3251, the MRA switch 3210 and the MRA switch 3120.

As described above, according to the fifth embodiment, it is possible to duplicate the data routes in the FEIF 3200 and enhance the reliability of the storage apparatus.

Figure 33:
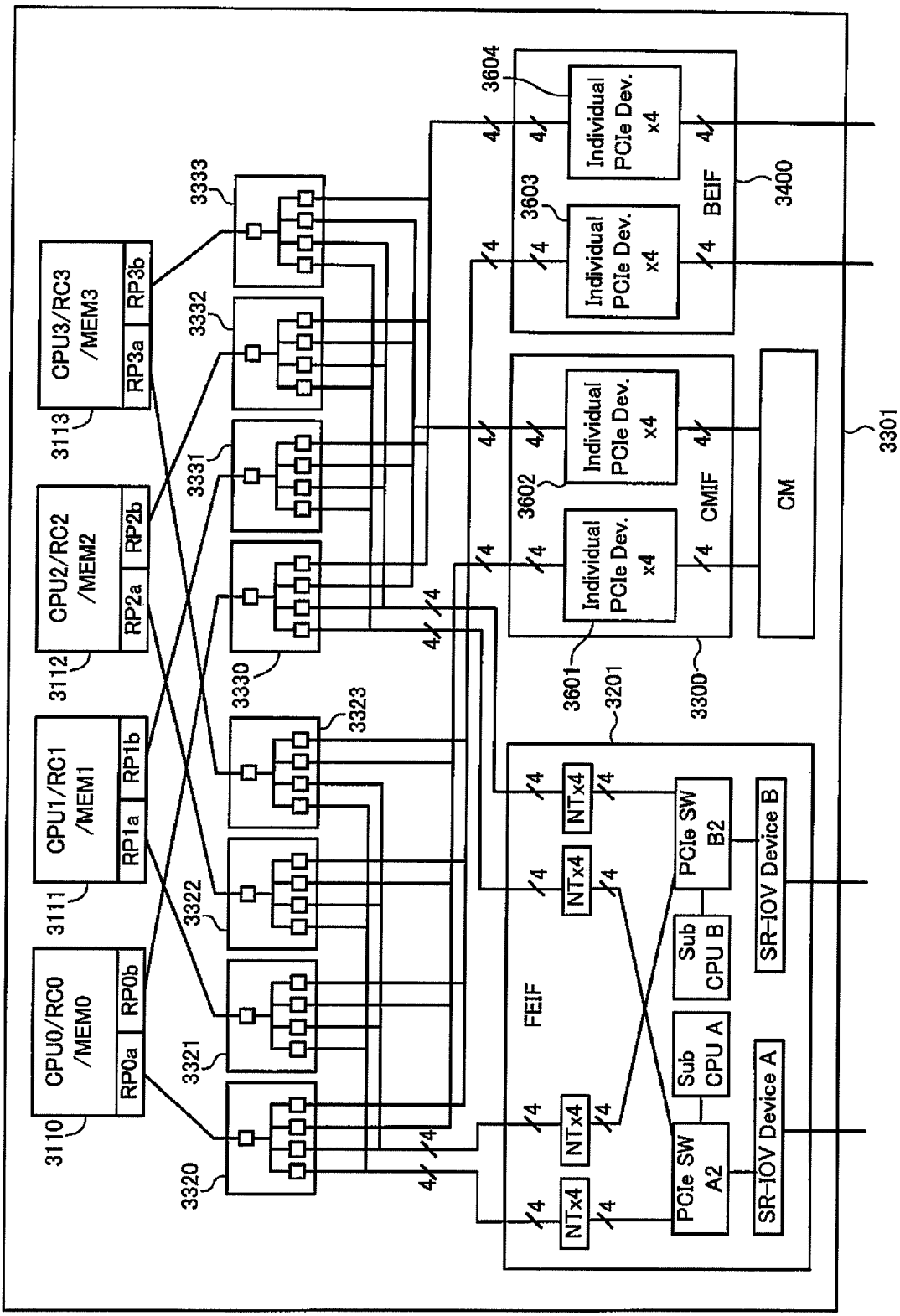
FIG. 33 is a diagram showing the configuration of a controller 3301 obtained by realizing a configuration equal to that of the controller 3101 in FIG. 31 without using MRA switches 3120 and 3121.

FIG. 33 is a diagram showing the configuration of a controller 3301 obtained by realizing a configuration equal to that of the controller 3101 in FIG. 31 without using MRA switches 3120 and 3121. The virtual switches 3130 to 3133 in the MRA switch 3120 in FIG. 31 correspond to PCIe switches 3320 to 3323 in FIG. 33. The virtual switches 3140 to 3143 in the MRA switch 3121 in FIG. 31 correspond to PCIe switches 3330 to 3333 in FIG. 33.

An FEIF 3201 has a configuration obtained by omitting the MRA switches 3210 and 3211 from the FEIF 3200 in FIG. 32. Each of the PCIe switches 3320 to 3323 and 3330 to 3333 and each of the storage interfaces (the FEIF 3201, the CMIF 3300 and the BEIF 3400) are connected by a separate PCIe link.

The CMIF 3300 includes four PCIe devices 3601 which the main processors can access via the PCIe switches (3320 to 3323) and four PCIe devices 3602 which the main processors can access via the PCIe switches (3330 to 3333).

The BEIF 3400 includes four PCIe devices 3603 which the main processors can access via the PCIe switches (3320 to 3323) and four PCIe devices 3604 which the main processors can access via the PCIe switches (3330 to 3333).

Fifth Embodiment: Summary

As described above, according to the fifth embodiment, the controller 3301 can duplicate the data routes between the main processors and the storage interfaces and the data routes in the FEIF 3201, similarly to the storage controller 3101. Thereby, it is possible to enhance the reliability of the storage apparatus.

The configuration for duplicating the internal networks in the controller 3301 described in the fifth embodiment can be adopted under the configuration of each of the first to fourth embodiments.

Sixth Embodiment

In a sixth embodiment of the present invention, description will be made on a configuration example in which any of main processors is also used as a sub-processor. Since the procedure for the virtual port migration process is similar to that of the first to fifth embodiments, different points related to use of a processor also as a sub-processor will be mainly described below.

Figure 34:
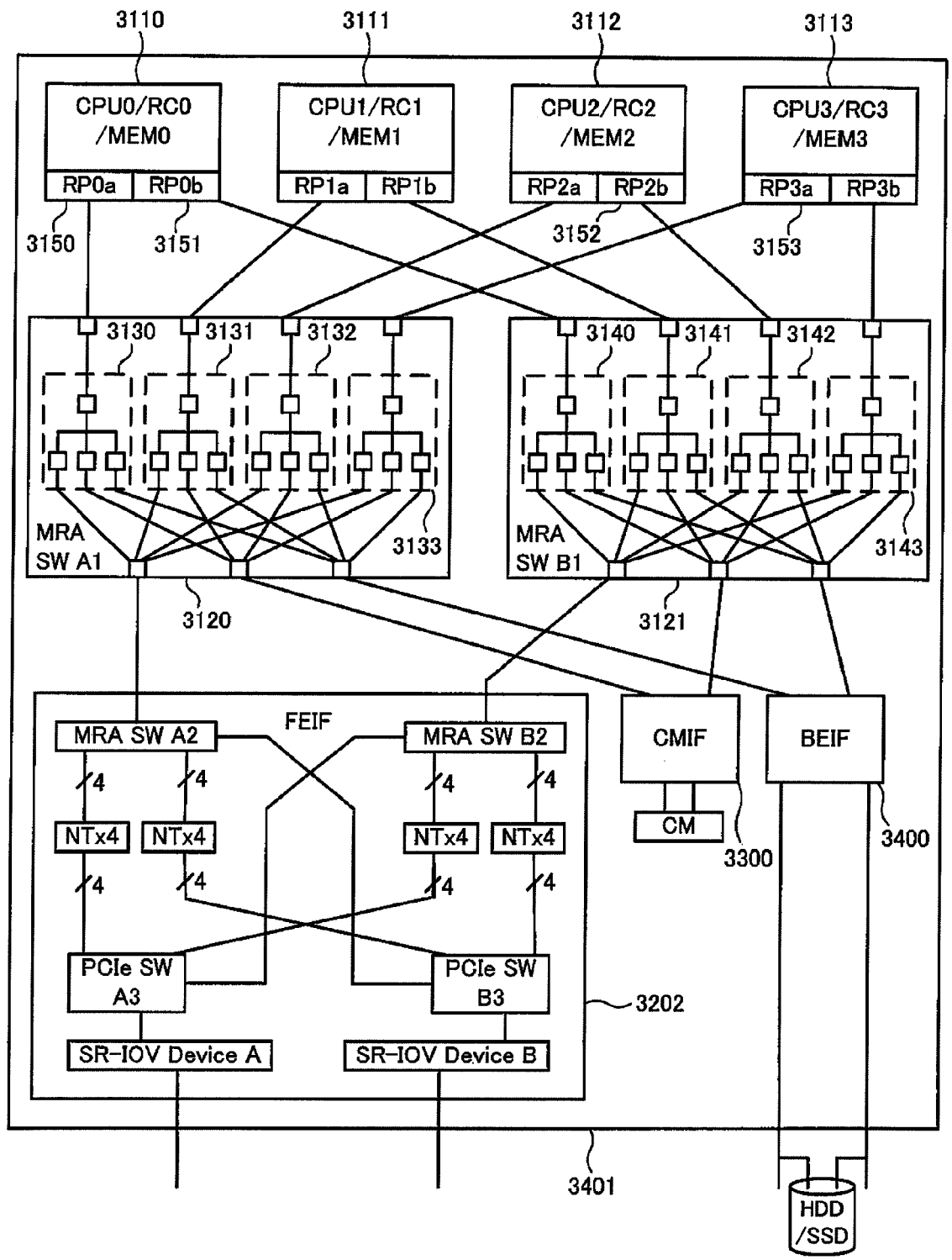
FIG. 34 is a diagram showing a controller 3401 in which internal networks are redundant.

FIG. 34 is a diagram showing a controller 3401 in which internal networks are redundant. The configuration of the controller 3401 is the same as that of the storage controller 3101 in FIG. 31 except that an FEIF 3202 is provided instead of the FEIF 3200 in FIG. 31. The FEIF 3202 does not include a sub-processor, and any of main processors operates as a sub-processor.

Figure 35:
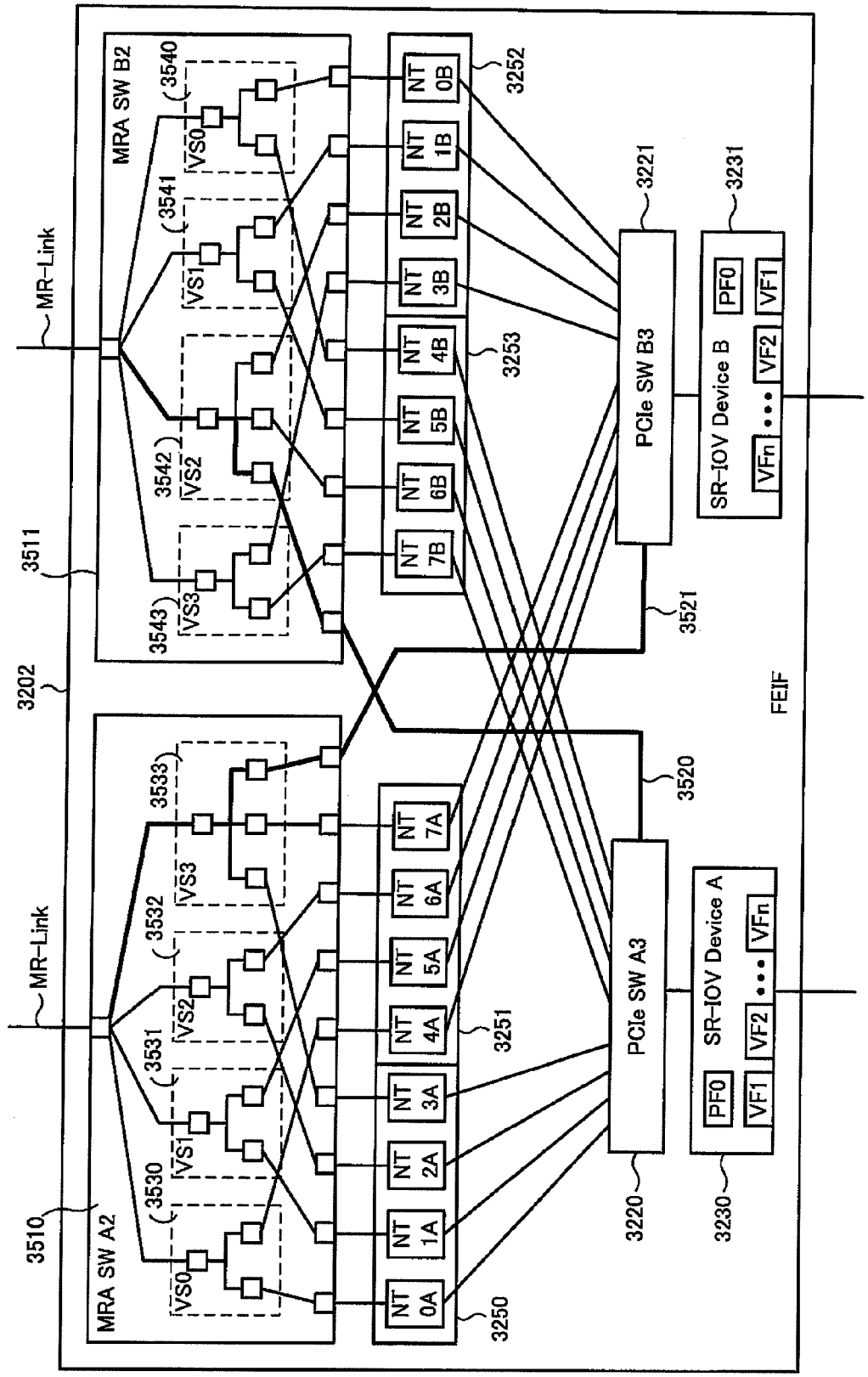
FIG. 35 is a diagram showing the internal configuration of an FEIF 3202.

FIG. 35 is a diagram showing the internal configuration of the FEIF 3202. The FEIF 3202 differs from the FEIF 3200 in FIG. 32 in that it does not include a sub-processor and in the configuration of MRA switches 3510 and 3511.

The MRA switch 3510 includes four virtual switches 3530 to 3533. Similarly, the MRA switch 3511 includes four virtual switches 3540 to 3543. Each of the virtual switches 3533 and 3542 includes three downstream bridges. Each of the other virtual switches includes two downstream bridges. One of the downstream bridges of the virtual switch 3533 is connected to the PCIe switch 3221 via a PCIe link 3521. One of the downstream bridges of the virtual switch 3542 is connected to the PCIe switch 3220 via a PCIe link 3520.

A main processor 3112 (CPU2) can access the SR-IOV device 3230 via a root port 3152 (RP2b), the virtual switch 3142 in the MRA switch 3121, the virtual switch 3542 in the MRA switch 3511, the PCIe link 3520 and the PCIe switch 3220. The main processor 3112 (CPU2) can set and manage the virtual function units of the SR-IOV device 3230.

Similarly, a main processor 3113 (CPU3) can access the SR-IOV device 3231 via a root port 3153 (RP3a), the virtual switch 3133 in the MRA switch 3120, the virtual switch 3533 in the MRA switch 3510, the PCIe link 3521 and the PCIe switch 3221. The main processor 3113 (CPU3) can set and manage the virtual function units of the SR-IOV device 3231.

In addition to data transfer control among storage interfaces, the main processors 3112 and 3113 also perform a process related to the virtual function units which the sub-processor is in charge of in the first to fifth embodiments.

When main processors are configured by multiple processor resources logically or physically, at least one processor resource is assigned as a sub-processor to be used for controlling SR-IOV devices, and the other processor resources are used for data transfer control which the main processors have been originally in charge of.

For example, the main processor 3112 (CPU2) also functions as a sub-processor, and the main processors and the sub-processor share the root port 3152 (RP2b) to perform data transfer control and setting and management of SR-IOV devices in the FEIF 3202. Similarly, the main processor 3113 (CPU3) also functions as a sub-processor, and the main processors and the sub-processor share the root port 3153 (RP3a) to perform data transfer control and setting and management of SR-IOV devices in the FEIF 3202.

Sixth Embodiment: Summary

As described above, according to the sixth embodiment, it is possible to use a main processor also as a sub-processor and exclude the necessity of a separate sub-processor and, therefore, it is possible to reduce the cost of the storage apparatus.

The configuration of using a main processor also as a sub-processor described in the sixth embodiment can be adopted under the configuration of each of the first to fifth embodiments.

The invention made by the inventor has been specifically described on the basis of the embodiments. However, the present invention is not limited to the embodiments, and it goes without saying that various modifications are possible within the range not departing from the spirit thereof.

Each of the configurations, functions, processing sections and the like described above can be realized as hardware, for example, by designing all or a part thereof with an integrated circuit and can be realized as software by a processor executing a program for realizing each function. Information such as programs for realizing the functions and tables can be stored in a storage device such as a memory and a hard disk or a storage medium such as an IC card and a DVD.

Reference Signs List
- 100 storage apparatus
- 101 storage controller
- 102 management terminal
- 10 to 13 main processor
- 110 to 113 root port
- 120 to 123 PCIe switch
- 200 front-end interface (FEIF)
- 300 cache memory interface (CMIF)
- 310 cache memory (CM)
- 330 channel
- 340 to 343 PCIe device
- 400 back-end interface (BEIF)
- 410 disk array
- 430 channel
- 440 to 443 PCIe device
- 201 sub-processor
- 202 root port
- 210 to 213 non-transparent bridge
- 220 PCIe switch
- 230, 231 SR-IOV device
- 232 physical function unit
- 233 virtual function unit
- 238 physical port
- 240 channel
- 250 PCIe tree
- 254 physical port
- 255 higher-level apparatus
- 256 external network
- 257 external network
- 800 to 803 RID mapping table
- 810 to 813 RID mapping table
- 1500 NTB management table
- 1600 virtual port management table
- 2500 storage apparatus
- 2501 storage controller
- 2601 FEIF
- 40 MRA switch
- 2610 to 2613 virtual switch
- 2602 CMIF
- 50 MRA switch
- 2700 to 2703 virtual switch
- 2603 BEIF
- 60 MRA switch
- 2800 to 2803 virtual switch
- 30 MRA switch
- 130 to 133 virtual switch
- 2604, 2704, 2804 MR-link
- 3110 to 3113 main processor
- 3120 to 3121 MRA switch
- 3200 FEIF
- 3300 CMIF
- 3400 BEIF
- 3240 to 3241 sub-processor
- 3220 to 3221 PCIe switch
- 3230 to 3231 SR-IOV device
- 3210 to 3211 MRA switch
- 3250 to 3253 NTB array
- 3320 to 3323 PCIe switch
- 3330 to 3333 PCIe switch
- 3201 FEIF
- 3300 CMIF
- 3400 BEIF
- 3401 storage controller
- 3202 FEIF
- 3510 to 3511 MRA switch
- 3530 to 3533 virtual switch
- 3540 to 3543 virtual switch

The invention claimed is:

1. A storage apparatus (100) storing data, comprising:
a storage device (410) storing the data;
a first interface device (200) connected to a host system and controlling data input/output between the storage apparatus (100) and the host system;
a second interface device (400) connected to the storage device (410) and controlling data input/output to and from the storage device (410);
a main processor controlling data transfer inside the storage apparatus (100);
a first switch mutually connecting the main processor, the first interface device (200) and the second interface device (400); and
a sub-processor (201) controlling the operation of the first interface device (200); wherein
the first interface device (200) comprises:
a second switch connecting to the first switch;
a physical port connecting the first interface device (200) and an external network;
a virtual port device having multiple virtual function units which provide virtual ports of the first interface device (200) using the physical port; and
a non-transparent bridge including a mapping table for translating device identifiers of the virtual function units, and relaying communication between the first switch and the second switch after translating the device identifier using the mapping table;
the sub-processor (201)
enables any one or more of the virtual function units the device identifiers of which are registered with the mapping table; and
does not enable any one or more of the virtual function units the device identifiers of which are registered with the mapping table; and
the main processor communicates with the virtual function unit enabled by the sub-processor (201), via the non-transparent bridge.

2. The storage apparatus according to claim 1, wherein the sub-processor (201) executes a virtual port migration step of migrating the process of the virtual function unit to another virtual function unit, the virtual port migration step comprising the steps of:
canceling enablement of the enabled virtual function unit;
newly enabling the virtual function unit which has not been enabled; and
setting port identification information about the virtual function unit for which enablement has been canceled as port identification information about the virtual function unit which has been newly enabled.

3. The storage apparatus according to claim 2, wherein the sub-processor (201) deletes the entry of the virtual function unit for which enablement is to be canceled, from a device tree, and discards the instance of the device driver of the virtual function unit for which enablement is to be canceled, at the step of canceling enablement of the enabled virtual function unit; and
registers the virtual function unit to be newly enabled with the device tree and creates an instance of the device driver of the virtual function unit to be newly enabled, at the step of newly enabling the virtual function unit.

4. The storage apparatus according to claim 2, wherein the storage apparatus (100) comprises a plurality of the main processors;

the first interface device (200) includes a non-transparent bridge management table in which connection relationships among the non-transparent bridge, the virtual function units and the main processors are described; and the sub-processor (201) refers to the non-transparent bridge management table to identify the main processor to be notified that the virtual function unit has been newly enabled or that enablement of the virtual function unit has been canceled, and transmits the notification to the main processor.

5. The storage apparatus according to claim 1, wherein the sub-processor (201) is connected to the second switch which the first interface device (200) includes.

6. The storage apparatus according to claim 1, wherein when detecting that a fault has occurred in the enabled virtual function unit, the sub-processor (201)

enables a virtual function unit in which a fault has not occurred, among the virtual function units which have not been enabled; and sets port identification information about the virtual function unit in which the fault has occurred as port identification information about the newly enabled virtual function unit.

7. The storage apparatus according to claim 2, wherein the storage apparatus (100) comprises a management device for setting a condition at the time of the first interface device (200) executing the virtual port migration process; and the management device instructs the sub-processor (201), as the condition, whether or not to change the main processor to communicate with the virtual port after migration in accordance with the virtual port migration step, from the main processor communicating with the virtual port before the migration; and whether or not to change the physical port between before and after the virtual port migration step; and the sub-processor (201) executes the virtual port migration process in accordance with the condition received from the management device.

8. The storage apparatus according to claim 2, wherein the storage apparatus (100) comprises a plurality of the main processors;

any of the multiple main processors detects that a fault has occurred in the virtual function unit;

the main processor connected to any of the enabled virtual function units instructs the sub-processor (201) to execute the virtual port migration process; and the sub-processor (201) executes the virtual port migration process in accordance with the instruction received from the main processor.

9. The storage apparatus according to claim 1, wherein the first interface device (200) comprises a plurality of the non-transparent bridges;

the main processor comprises a first root port connected to the first interface device (200) and a second root port connected to the first interface device (200);

connects to a first non-transparent bridge among the multiple non-transparent bridges via the first root port; and connects to a second non-transparent bridge among the multiple non-transparent bridges via the second root port; and the mapping table which the first non-transparent bridge includes and the mapping table which the second non-transparent bridge includes holds the same data about the device identifiers of the virtual function units.

10. The storage apparatus according to claim 1, wherein the first switch is a multi-root aware switch; and instead of the storage apparatus (100) including the sub-processor (201), the main processor is connected to the virtual port device via the first switch and the second switch and executes the same process as the sub-processor (201) in addition to a process related to data transfer control inside the storage apparatus (100).

* * * * *